US010717633B2

(12) United States Patent
Moore et al.

(10) Patent No.: US 10,717,633 B2
(45) Date of Patent: Jul. 21, 2020

(54) ADJUSTABLE LENGTH TENSIONING MEMBER

(71) Applicant: Manitowoc Crane Companies, LLC, Manitowoc, WI (US)

(72) Inventors: Ian M. Moore, Manitowoc, WI (US); Derrick L. Geiser, Manitowoc, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 0 days.

(21) Appl. No.: 16/678,228

(22) Filed: Nov. 8, 2019

(65) Prior Publication Data

US 2020/0071139 A1   Mar. 5, 2020

Related U.S. Application Data

(62) Division of application No. 15/122,473, filed as application No. PCT/US2015/018504 on Mar. 3, 2015, now Pat. No. 10,479,657.

(60) Provisional application No. 61/947,303, filed on Mar. 3, 2014.

(51) Int. Cl.
| *B66C 23/00* | (2006.01) |
| *B66C 23/70* | (2006.01) |
| *B66C 23/82* | (2006.01) |
| *F16G 11/02* | (2006.01) |
| *F16G 11/12* | (2006.01) |
| *F16G 11/00* | (2006.01) |

(52) U.S. Cl.
CPC ............ *B66C 23/70* (2013.01); *B66C 23/823* (2013.01); *F16G 11/00* (2013.01); *F16G 11/025* (2013.01); *F16G 11/12* (2013.01); *B66C 23/00* (2013.01)

(58) Field of Classification Search
CPC ....... B66C 23/70; B66C 23/00; B66C 23/823; F16G 11/00; F16G 11/025; F16G 11/12
See application file for complete search history.

(56) References Cited

U.S. PATENT DOCUMENTS

| 4,850,161 | A | * | 7/1989 | McGinnis | ............... E04H 12/18 52/108 |
| 7,516,858 | B2 | * | 4/2009 | Willim | ..................... B66C 23/66 212/168 |
| 10,053,340 | B2 | | 8/2018 | Albinger et al. | |
| 2004/0060887 | A1 | * | 4/2004 | Willim | .................. B66C 23/701 212/348 |
| 2004/0129663 | A1 | * | 7/2004 | Willim | .................. B66C 23/701 212/177 |
| 2010/0243595 | A1 | * | 9/2010 | Walker | .................... B66C 23/26 212/294 |

(Continued)

*Primary Examiner* — Nkeisha Smith
(74) *Attorney, Agent, or Firm* — Ramey & Schwaller, LLP; Craig Buschmann

(57) ABSTRACT

An adjustable length tensioning member that comprises a rope, a first connector on the rope, a second connector on the rope, and a plurality of connection points between the first connector and the second connector is disclosed. The plurality of connection points have a diameter greater than a diameter of the rope. The rope may be passed through a socket coupled to a first crane component and one of the connectors on the rope is coupled to a second crane component. One of the plurality of connection points engages a seat on the socket to tension the rope between the socket and the connection point.

3 Claims, 21 Drawing Sheets

(56) References Cited

U.S. PATENT DOCUMENTS

2010/0294735 A1* 11/2010 Walker .................... B66C 23/82
  212/232
2012/0175333 A1* 7/2012 Pech ....................... B66C 23/82
  212/177

* cited by examiner

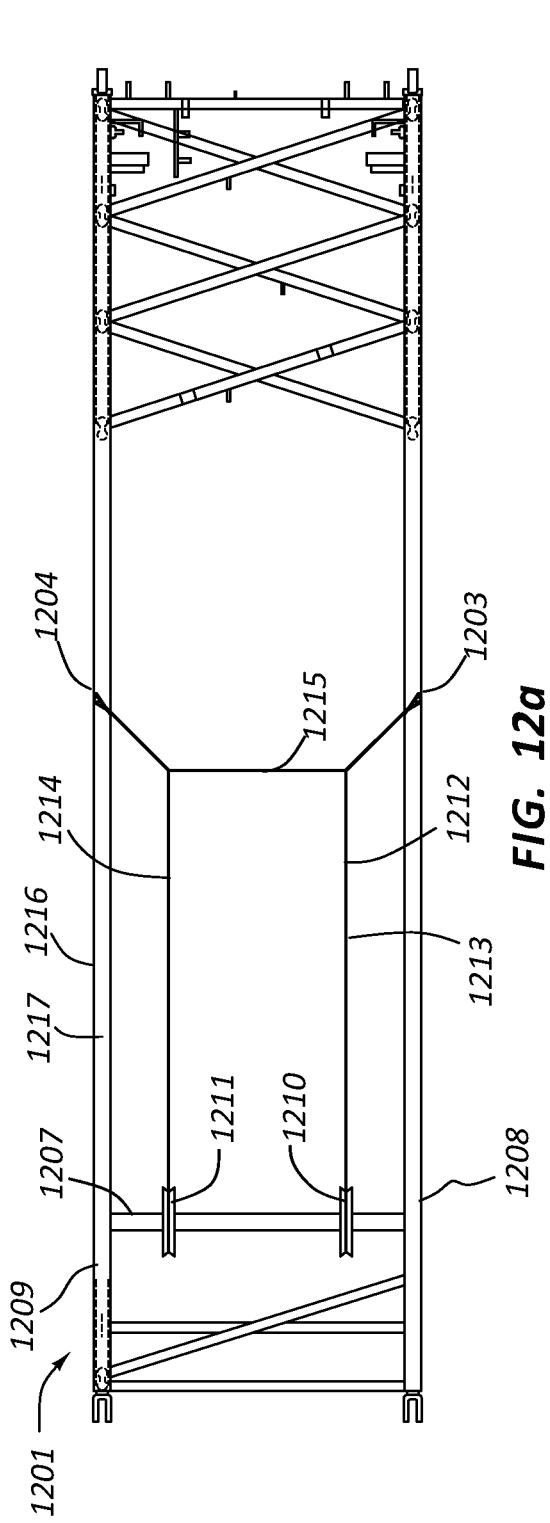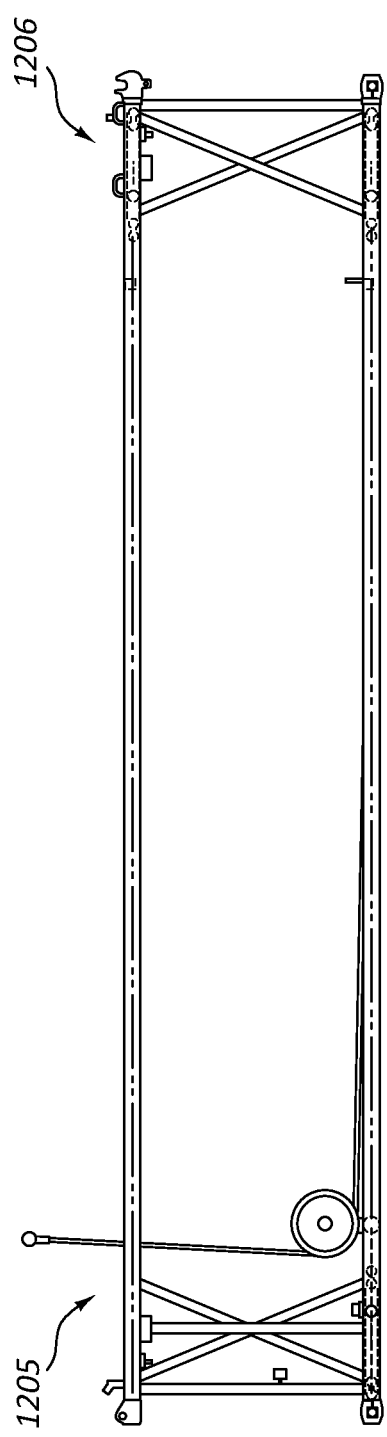
FIG. 12a
FIG. 12b

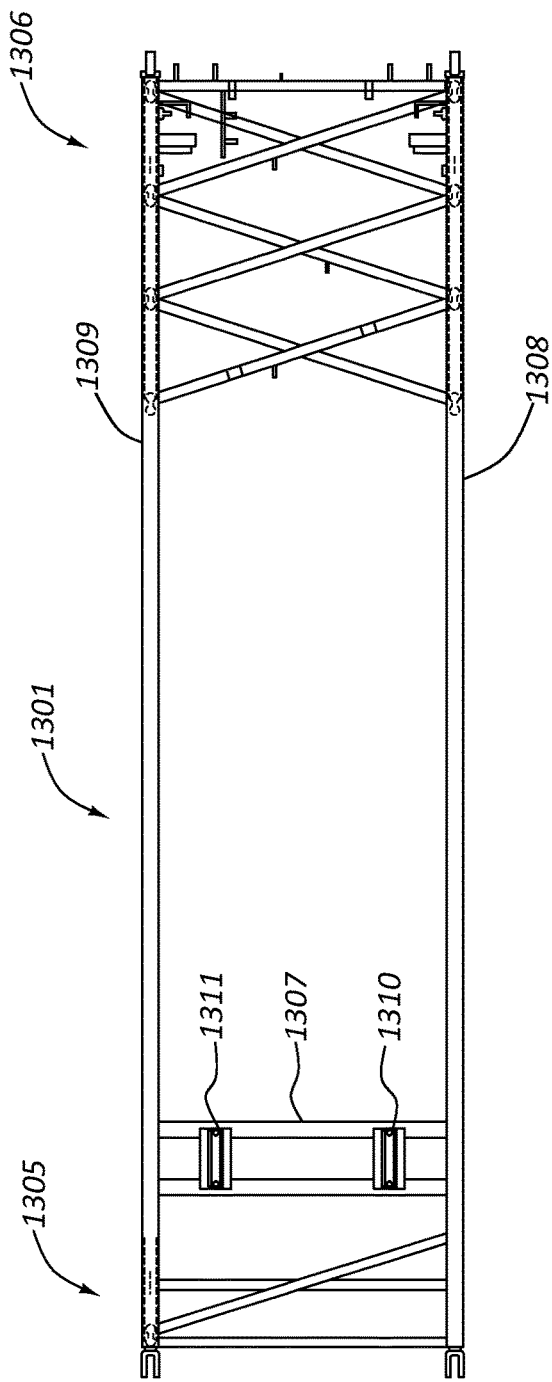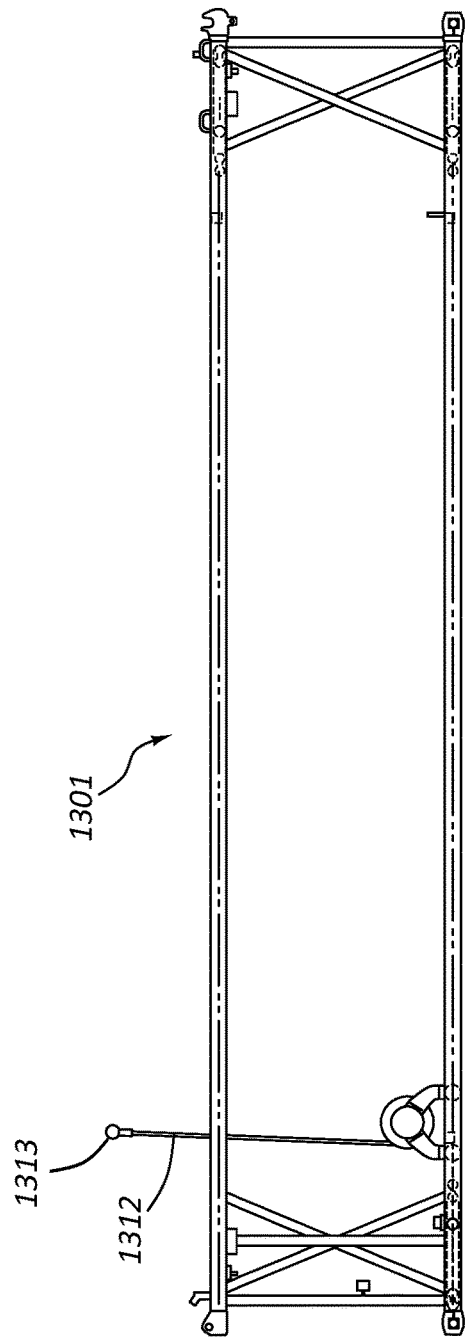
FIG. 13a
FIG. 13b

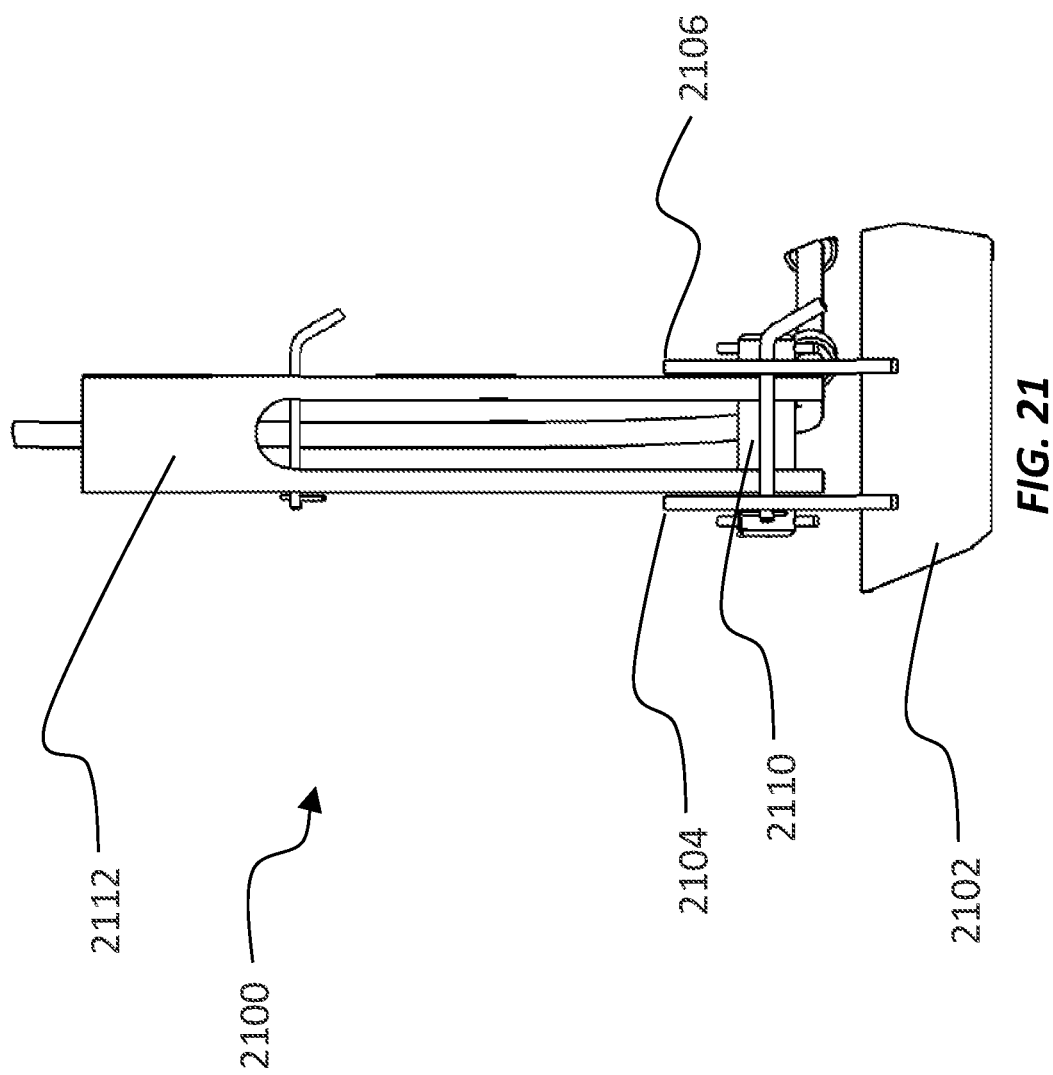

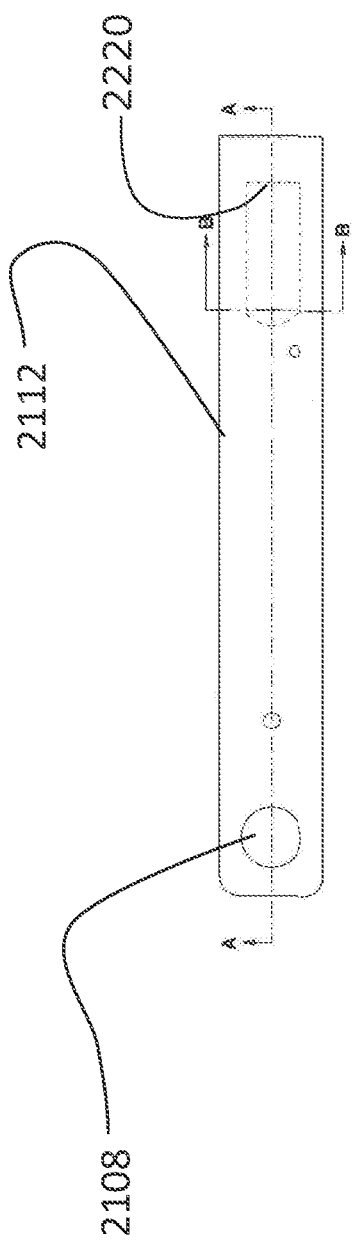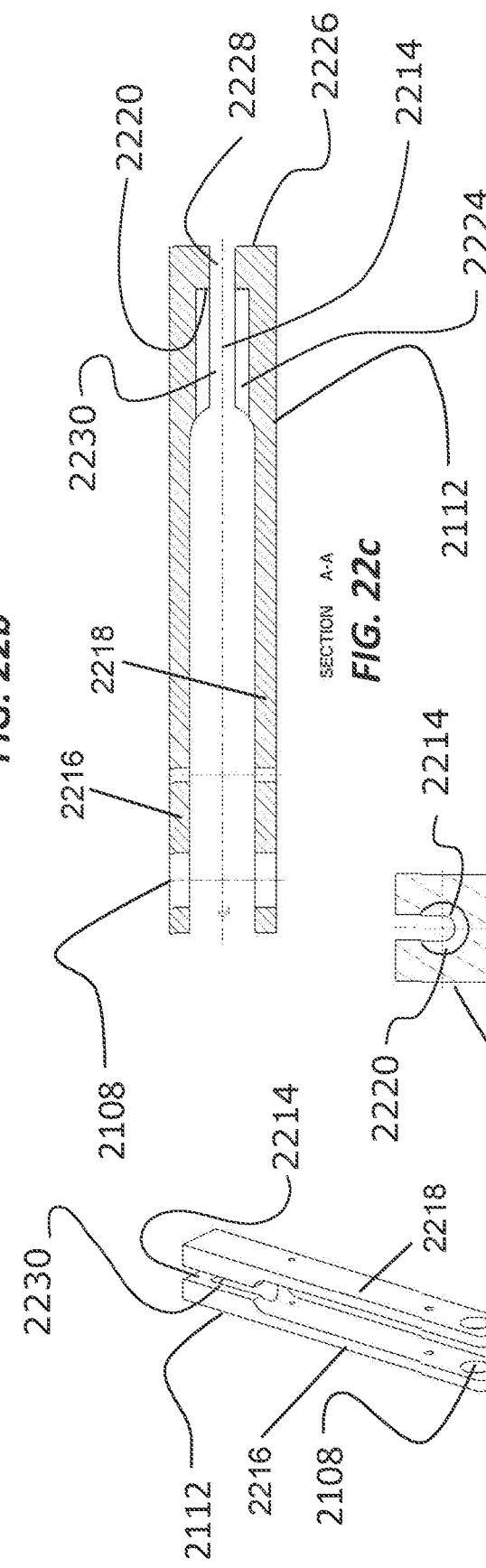

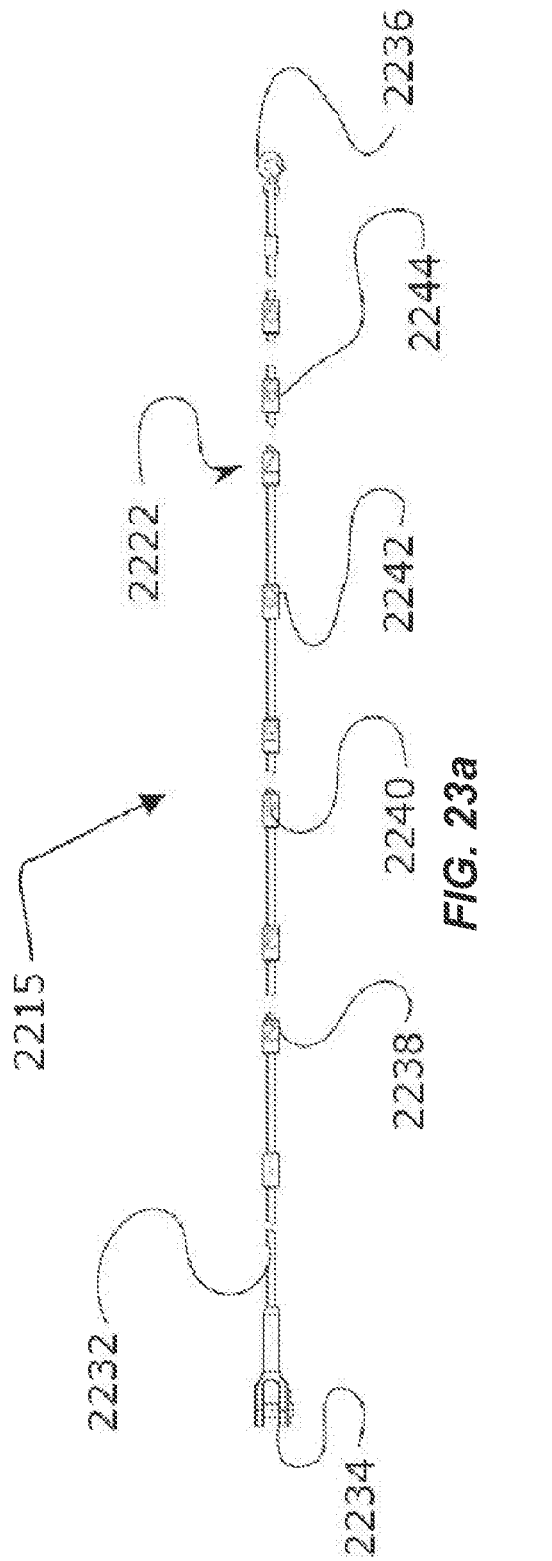
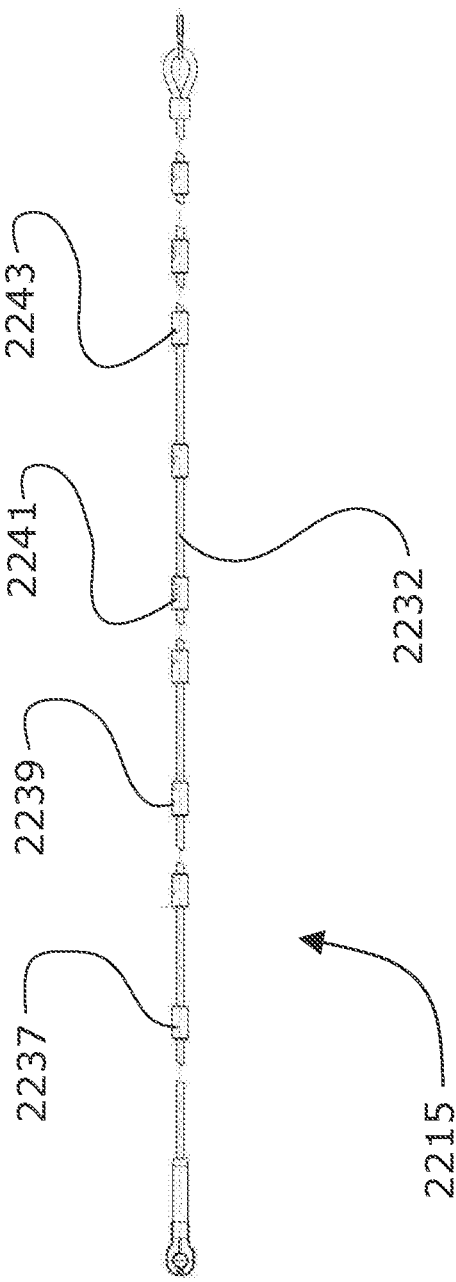

ADJUSTABLE LENGTH TENSIONING MEMBER

REFERENCE TO EARLIER FILED APPLICATIONS

The present patent application is a divisional of U.S. patent application Ser. No. 15/122,473, filed Aug. 30, 2016, and titled ADJUSTABLE LENGTH TENSIONING MEMBER, which issued as U.S. Pat. No. 10,479,657 on Nov. 19, 2019, which claims priority to International Patent Application No. PCT/US2015/018504, filed Mar. 3, 2015, which claims the benefit of the filing date under 35 U.S.C. § 119(e) of U.S. Provisional Pat. App. No. 61/947,303, filed Mar. 3, 2014, and titled "SYSTEM AND METHOD FOR CONNECTING A CRANE SUSPENSION ASSEMBLY TO A SUPPORT COLUMN." All of the foregoing applications are hereby incorporated by reference.

TECHNICAL FIELD

The disclosed subject matter relates to systems and methods for connecting crane components to one another. More particularly, the disclosed subject matter relates to systems and method for an adjustable length tensioning member between cranes components.

BACKGROUND

Lift cranes typically include a carbody; ground engaging members elevating the carbody off the ground; a rotating bed rotatably connected to the carbody such that the rotating bed can swing with respect to the ground engaging members; and a boom pivotally mounted on the rotating bed, with a load hoist line extending there from. For mobile lift cranes, there are different types of moveable ground engaging members, most notably tires for truck mounted cranes, and crawlers. Typically mobile lift cranes include a counterweight to help balance the crane when the crane lifts a load. Typical cranes include a boom suspension that is used to change the angle of the boom and provide tension forces to offset the forces applied to the boom by the load on the load hoist line so that the boom can behave as a column member with only compressive forces acting through the length of the boom.

A typical crane is designed to be set up in multiple configurations. Each configuration typically has differing components and varying geometry between components in a given configuration. For example, a crane may be designed to be set up with different boom length configurations to optimize the capacity that the crane can handle, only using as long of a boom as is necessary for a particular lift operation that the crane is being set up for. Since the boom length will vary between different configurations, the boom suspension also has to be designed to accommodate different boom lengths. Typically the boom suspension includes multiple sections of suspension members that are connected together, sometimes referred to as boom backstay straps, which connect between the top of the boom and either an equalizer suspended between the boom and a fixed mast, or between the boom and the top of a live mast. On a crane with a relatively long boom, the suspension may additionally be connected to the boom at an intermediate location less than the top of the boom. On a typical crane with a fixed mast, the boom hoist rigging has multiple parts of line that run between the equalizer and the top of the mast, and is used to control the angle of the boom.

Since the crane will be used in various locations, it needs to be designed so that it can be transported from one job site to the next. This usually requires that the crane be dismantled into components that are of a size and weight that they can be transported by truck within highway transportation limits. The ease with which the crane can be dismantled and set up has an impact on the total cost of using the crane. Thus, to the extent that fewer man-hours are needed to set up the crane, there is a direct advantage to the crane owner or renter.

It is convenient to transport the sections of the boom straps and jib backstay straps with the sections of boom between one job site and the next. This is because, for the most part, the number of sections and the length of each section of the boom straps and the jib backstay straps that will be needed are dependent on the number and lengths of the boom sections that are used to construct the boom. For example, a 100 foot boom may be made from a 10 foot boom butt, a 10 foot boom top and four 20 foot boom inserts. However, if the boom is going to be 120 feet long, five 20 foot boom inserts will be used. If the boom is going to be 130 feet long, five 20 foot inserts and one 10 foot insert will be used.

A typical boom insert has connectors at each end for connection to an adjacent crane section. The connectors are typically tabs having an aperture for receiving a pin. A boom insert may have complementary connectors at each end of the boom insert. For example, a near end of the boom insert may have single tabs with an aperture. A far end of the boom insert may use sets of tabs spaced apart by the thickness of the tab on the first end. Thus when the boom inserts are placed together end to end, the single tab of the first end may be orientated between the two tabs of the second end with their apertures aligned. A pin is then inserted through the apertures coupling the boom inserts together. To aid in alignment of the boom inserts during assembly, the tabs on an upper side of a boom insert may be replaced by bracket and pin. The far end of the boom insert may have a bracket on the upper side with the bracket opening upward. The near end of the boom insert may have a horizontal pin complementary to the bracket. Two boom connections may then be assembly by joining the bracket and pin with the boom inserts angled relative to one another. Then, with the pin in the bracket, the boom insert is rotated until the tabs on the lower section are aligned. A pin is then inserted into the aperture of the tabs and the boom sections are coupled together.

When other components, such as an intermediate connection to the suspension are required, they are typically provided as a set for a given crane configuration. For example, an intermediate suspension connector such as a pendant assembly is often used to join a suspension to the boom when an extended boom configuration is used. A pendant assembly having a fixed, predetermined length connects to the boom at the connection between adjacent boom inserts. Typically, the lower pins are replaced by longer pins. The pendant assembly has tabs on its lower end that are spaced apart the width of the outer tabs of the boom insert. Thus when the boom is assembled, the boom inserts are coupled together as described previously with the exception that the pendant assembly is placed over the tabs of the boom insert. Apertures in the pendant tabs are aligned with the apertures in the boom insert tabs and the longer pin is inserted through the pendant tabs and the boom insert tabs. The longer pin couples the boom inserts together along with the pendant assembly.

The described system of attaching a pendant assembly to a boom is advantageous in that it requires no special parts other than the pendant assembly and the longer pins. If the pendants assembly is not required, it is simply not attached between boom sections. Because constructing the boom and modifying its configuration often results in significant downtime, any alteration of the boom at the worksite is typically discouraged. Therefore it is important that the proper pendant assembly be delivered with the boom inserts.

However, the additional pendant assembly complicates assembly of the crane sections by the additional alignment necessary with the pendant assembly. Also, because the pendant assembly is a separate component, there exists the possibility that the pendant assembly may be lost or unavailable when assembling the boom. The assembly of the boom cannot be completed until the pendant is in place. This problem may arise in the context of any crane component. Since each component is predetermined based on its function and size, any missing component will halt construction of the crane at the worksite. Therefore there would be a great benefit if it were possible to assemble crane components by a method that allowed for at some of the components to have varying sizes suitable for multiple connections, but that still provide the relative strength, durability, and ease of construction of fixed crane components. Further, by simplifying the connection of the components, such as when a pendant is required, the amount of time it takes to assemble a crane would be shortened and potential delays reduced.

BRIEF SUMMARY

In one aspect, an adjustable length tensioning member for a crane is disclosed that includes a rope, a first connector, a second connector, and a plurality of connection points. The rope has a first end, a second end, and a first diameter. The first connector is disposed at the first end of the rope, the second connector is disposed at the second end of the rope, and the plurality of connection points are disposed between the first connector and the second connector. The plurality of connection points have a second diameter greater than the first diameter.

In some embodiments, the first connector has two parallel tabs secured to the first end of the rope and the parallel tabs have an aperture there through sized and shaped to receive a pin for connection to a crane component. In some embodiments, the second connector is a safety hook having a load capacity less than a load capacity of the first connector.

In some embodiments, each of the plurality of connection points is a fitting secured to the rope. In some embodiments, the fitting is a sleeve swaged over the rope.

In another aspect, an adjustable length tensioning assembly is disclosed that includes a rope connection and a socket. The rope connector includes a rope having a first end, a second end, and a first diameter, a first rope connector disposed at the first end of the rope, with the first rope connector configured to connect to a first crane component; a second rope connector disposed at the second end of the rope; and a plurality of connection points disposed between the first connector and the second connector with the plurality of connection points having a second diameter greater than the first diameter. The socket includes a first end having a socket connector configured to connect to a second crane component; a second end having an recess housing a portion of the rope connector, the recess having a first portion having a third diameter greater than the second diameter and a second portion having a fourth diameter greater than the first diameter and less than the second diameter, the transition from the first portion to the second portion forming a seat; and an access slot extending laterally from a lateral side of the socket to the recess and axially the length of the recess, the access slot having a width greater than the first diameter and less than the second diameter.

In some embodiments, the first connector is two parallel tabs secured to the first end of the rope, with the parallel tabs having an aperture there through sized and shaped to receive a pin for connection to a crane component. In some embodiments, the second connector is a safety hook having a load capacity less than a load capacity of the first connector.

In some embodiments, each of the plurality of connection points is a fitting secured to the rope. In some embodiments, the fitting is a sleeve swaged over the rope.

In some embodiments, the socket further includes an aperture disposed traverse to the recess, the aperture sized and shaped to receive a retaining pin for retaining a connection point of the rope connector in the recess. In some embodiments, the socket connector has two legs having a socket connector aperture sized and shaped to receive a pin for a rotatable connection to a crane component. In some embodiments, the socket further includes a retaining aperture parallel to the socket connector aperture, the retaining aperture sized and shaped to receive a retaining pin configured to inhibit rotation of the socket.

In another aspect a method for connecting a tensioning assembly between two crane components is disclosed the includes coupling a first end of a rope connector to a first crane component, the rope connector having a plurality of enlarged diameter connection points; coupling a socket to a second crane connection point, the socket having an recess with a first portion having a diameter greater than a diameter of the enlarged diameter connection points and a second portion having a diameter greater than a diameter of the rope connector and less than the diameter of the enlarged portions, the transition from the first portion to the second portion forming a seat; passing a portion of the rope connector into the second portion until an enlarged diameter connection point is within the first portion; securing the enlarged diameter connection point within the first portion; and moving the first crane component relative to the second crane component to tension the tensioning assembly.

In some embodiments, the method further includes securing a second end of the rope connector to the second crane component.

In some embodiments passing the portion of the rope connector is performed with the socket non-perpendicular to a surface of the second crane component and wherein the method further includes, pivoting the socket perpendicular to the surface of the second crane component and securing the socket in place.

BRIEF DESCRIPTION OF THE DRAWINGS

FIG. 12a illustrates a top view of an alternative embodiment of an insert.

FIG. 12b illustrates a side view of the insert of FIG. 12a.

FIG. 13a illustrates a top view of an alternative embodiment of an insert.

FIG. 13b illustrates a side view of the insert of FIG. 13a.

FIG. 14b illustrates a side view of the insert of FIG. 14a.

FIG. 15b illustrates a side view of the insert of FIG. 15a.

FIG. 21 illustrates an embodiment of an adjustable length tensioning assembly.

FIG. 22a illustrates a perspective view of a socket for use in an adjustable length tensioning assembly.

FIG. 22b illustrates a side view of the socket of FIG. 22a.

FIG. 22c illustrates a cut away view of the socket of FIG. 22a.

FIG. 22d illustrates a cut away view of the socket of FIG. 22a.

FIGS. 23a and 23b illustrate a top view and a side view, respectively, of a rope connector for use in the adjustable tensioning assembly of FIG. 21.

DETAILED DESCRIPTION

Figure 1:
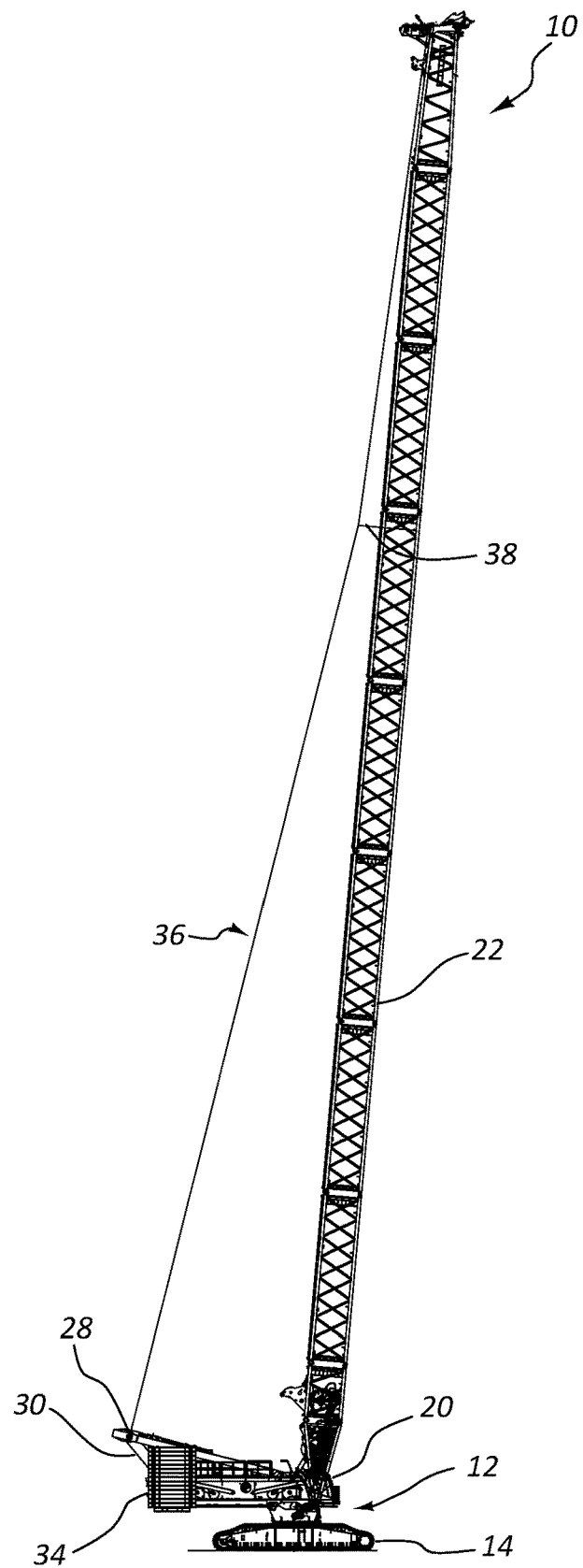
FIG. 1 illustrates a side view of an embodiment of a mobile lift crane having a live mast.

In the following passages, different embodiments are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The following terms used in the specification and claims have a meaning defined as follows.

The term "crane suspension assembly section" refers to sections that are connected together to form a suspension assembly for a crane. Examples of crane suspension assembly sections include a) sections, sometimes called strap sections, of the backstay between the boom top and the equalizer or live mast; b) sections of the backstay between a boom butt and a jib strut; c) sections of the backstay between a jib strut and a jib top, and d) counterweight strap sections between a mast top and a counterweight. Besides strap sections, which are traditionally elongated rigid metal members with a head on each end with a hole there through, sometimes wire rope pendants or even carbon fiber tension members are used to create the longitudinal part of the crane suspension assembly, and are therefore crane suspension assembly sections. The sections may be made of multiple parallel elongated members. The term "crane suspension assembly section" also includes the equalizer and the boom top, since these are parts of the boom suspension assembly and are connected to boom backstay straps. "Crane suspension assembly section" also includes other members attached to strap sections, such as the boom butt, the mast top, the jib top, jib strut tops and live mast top, and intermediate suspension members.

The term "pin" refers to a generally cylindrical member that allows pivotal rotation between two or more structures that have a hole through them and are connected together by the pin fitting through the holes. A pin may include a head or retainer, such as a cotter pin, on one or both ends to prevent the pin from sliding longitudinally through the holes. While most pins used in the present embodiments will have smooth shafts, a bolt with a threaded shaft may be used as a pin in some instances, and is such usages is therefore within the meaning of the term "pin."

The term "connector plate" refers to a structure used to hold an elongated section of the crane suspension assembly to other sections of the assembly. Typically connectors have two holes through them so that they can be attached, with a pin through each hole, between two adjoining straps in the crane suspension assembly. A connector may have only one link plate. More typically the connector is made of multiple link plates so that it can sandwich the head of the strap between the link plates and thus transfer tension loads equally through the two link plates without inducing bending moments through the connector/strap section joint. When the straps which the connectors are attached are made of multiple parallel elongated members, the connectors will often include a number of link plates one greater than the number of elongated members. For example, when the sections of the crane suspension system are made of two elongated members, the connector will be made with three link plates.

The term "tab" refers to an extension of material extending from a structure. A tab may be a separate component that is joined to the structure through commonly available techniques such as fasteners, welding, gluing or otherwise bonding. A "tab pair" refers to a pair of tabs that are used for a common purpose. For example, a tab pair may receive a component in a space between pair of tabs and both of the tabs may be used to secure the component.

While the disclosed subject matter will have applicability to many types of cranes, they will be described in connection with a mobile lift crane 10, shown in an operational configuration with a live mast in FIG. 1 and in an operational configuration with a fixed mast in FIG. 2. The mobile lift crane 10 includes lower works, also referred to as a carbody 12, and moveable ground engaging members in the form of crawlers 14. Of course additional crawlers than those shown can be used, as well as other types of ground engaging members, such as tires.

A rotating bed 20 is mounted to the carbody 12 with a slewing ring, such that the rotating bed 20 can swing about an axis with respect to the ground engaging members 14. The rotating bed 20 supports a boom 22 pivotally mounted on a front portion of the rotating bed 20; a live mast 28 mounted at its first end on the rotating bed 20, boom hoist rigging 30 connected to the live mast 28 adjacent a second end of the live mast 28; and a moveable counterweight unit 34. In FIG. 1, the counterweight unit 34 has multiple stacks of individual counterweight members on a support member. In other embodiments, the counterweight unit may have a single counter weight.

Boom hoist rigging 30 (described in more detail below) between the top of the live mast 28 and the rotating bed is used to control the angle of the live mast 28. A suspension assembly 36 between the top of the live mast 28 and the boom 22 supports the boom. A load hoist line (not shown) is trained over a pulley on the boom 22, supporting a hook (not shown) at a first end. At a second end, the load hoist line is wound on a first main load hoist drum (not shown) connected to the rotating bed 20. The rotating bed 20 includes other elements commonly found on a mobile lift crane 10, such as an operator's cab and a hoist drum for the boom hoist rigging 30.

The boom hoist rigging 30 includes a boom hoist line in the form of wire rope wound on a boom hoist drum, and reeved through sheaves on the live mast 28. The live mast 28 is connected to the rotating bed 20 though the boom hoist rigging 30 and to the boom through the suspension assembly 36. This arrangement allows rotation of the boom hoist drum to change the amount of boom hoist line between the live mast 28 and the rotating bed 20 changing the mast angle and thereby changing the boom angle through the suspension assembly 36.

As described above, the boom 22 is made by connecting multiple boom sections together and the boom 22 is supported during crane operation by the suspension assembly 36 made from boom strap sections. The top end of the suspension assembly 36 is connected to the top end of the boom 22 and an intermediate location of the suspension assembly 36 is connected to an intermediate location of the boom 22 through a pendant 38. In the crane of FIG. 1, the boom 22 connects to the suspension assembly 36 through multiple pendants 38 at different locations on the boom 22.

Figure 2:
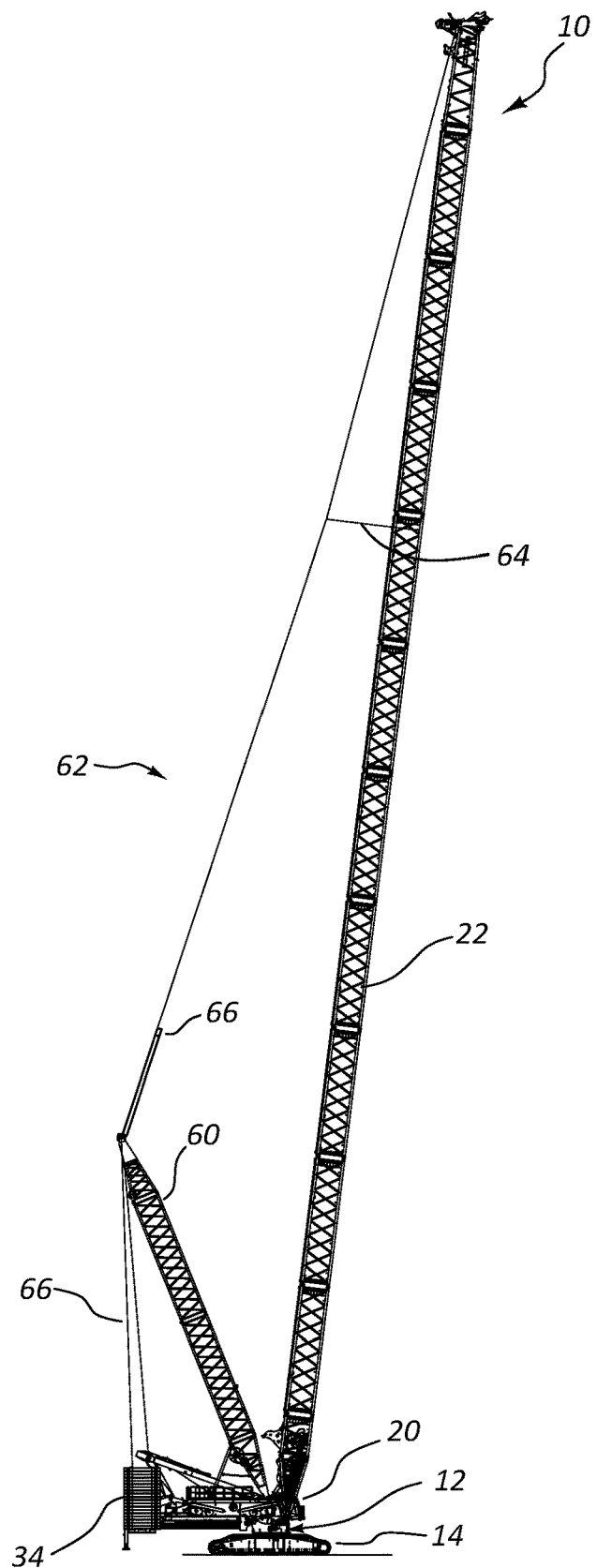
FIG. 2 illustrates a side view of an embodiment of a mobile lift crane having a fixed mast.

FIG. 2 illustrates the mobile lift crane of FIG. 1 having a fixed mast 60 in place of the live mast 28. The fixed mast 60 is connected to the boom 22 through suspension assembly 62. The suspensions assembly 62 is connected to the boom 22 at the hoist end near the top of the boom and at an intermediate location through a pendant 64. The fixed mast 60 has a boom hoist line reeved between the fixed mast 60 and an equalizer 66 coupled to the suspension assembly 62 configured to adjust the distance between the fixed mast 60 and the hoist end of the boom 22 thereby adjusting the boom angle. The suspension assembly 62 is made up of the boom strap sections as described previously.

Figure 3:
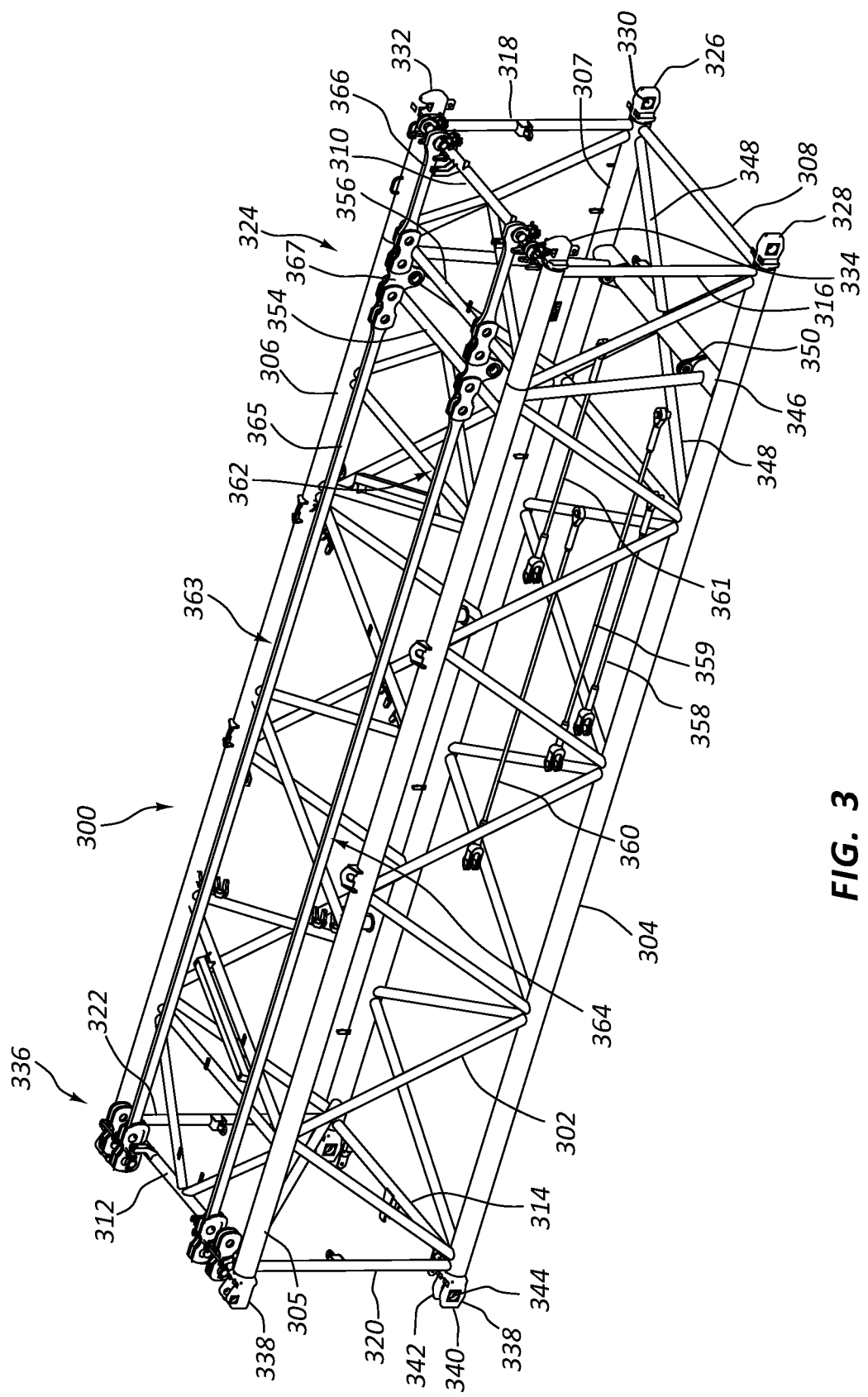
FIG. 3 illustrates a perspective view of a boom insert suitable for use in the embodiments of the mobile lift cranes of FIGS. 1 and 2.

FIG. 3 illustrates an embodiment of an intermediate suspension connection column segment in the form of a boom insert 300. An intermediate suspension connection column segment is not exclusive to a boom insert 300 and may be used in other column structures such as jibs and masts. Embodiments of intermediate suspension connection column segment are not limited to booms. A column may be formed of multiple intermediate suspension connection column segments allowing the suspension assembly to connect to the column in multiple locations.

The boom insert 300 includes a lattice of structural elements 302 coupled to four longitudinal shafts 304, 305, 306, 307. Other numbers of shafts and different types of construction of an intermediate suspension connection column segment are possible and the embodiment of FIG. 3 is only given as an example. The four shafts 304, 305, 306, 307 are arranged in a rectangular pattern with an axis of each shaft 304, 305, 306, 307 arranged on a vertex of the rectangular pattern. The shafts 304, 305, 306, 307 are parallel to one another along their axes such that together they form a column. The structural elements 302 are arranged diagonally along the sides of the boom insert 300 such as between shafts 304 and 305, shafts 305 and 306, shafts 306 and 307, and shafts 307 and 304. At each end of the boom insert 300 horizontal structural elements 308, 310, 312, 314 and vertical structural elements 316, 318, 320, 322 are arranged between the rods to form a rectangular end of the boom insert 300.

A first end 324 of the boom insert 300 has a first tab 326 and a second tab 328 extending from the lower shafts 304, 307 of the boom insert 300. Each tab 326, 328 has a horizontal aperture 330 sized and shaped to receive a pin. A first hook 332 and a second hook 334 extend respectively from the upper shafts 305, 306 of the first end 324 of the boom insert 300. The first hook 332 and the second hook 334 open upward and are sized and shaped to receive a pin.

A second end 336 of the boom insert 300 opposite the first end 324 has four tab pairs 338, with each tab pair 338 extending longitudinally from a shaft 304, 305, 306, 307. The tab pairs 338 each have a first tab 340 and a second tab 342 spaced apart by a distance slightly greater than a width of the tabs 326, 328 on the first end 324. The tab pairs 338 each have an aperture 344 sized and shaped to receive a pin.

A lower cross member 346 is disposed between the first end 324 of the boom insert 300 and the second end 336 of the boom insert 300. The lower cross member 346 extends from a first lower shaft 304 horizontally to a second lower shaft 307. The lower cross member 346 has additional structural supports 348 tying the lower cross member 346 into the boom insert 300. In other embodiments, it is possible that no additional structural supports are present. A first connector and a second connector are disposed on an upper side of the lower cross member 346. In the embodiment of FIG. 3 the first connector and the second connector are tabs 350, each having an aperture there through. The aperture provides a location for a pendant to attach to the lower cross member 346.

Two upper cross members 354, 356 are disposed on the upper shafts 305, 306 above the lower cross member 346. The upper cross members 354, 356 have a longitudinal spacing sufficient to allow a pendant to pass between them. In some embodiments, the two upper cross members 354, 356 have additional structural members tying them into the boom insert 300.

Pendant elements 358, 359, 360, 361 are stored within the lattice structure of the boom insert 300 when not in use. In other embodiments, the pendant elements 358, 359, 360, 361 are stored separate from the boom insert 300. A first pair of pendants 358, 361 has a first length for operating at a first boom length. A second pair of pendants 359, 361 has a second length for operating at a second boom length. Additionally pairs of pendants are possible for additional boom lengths. The pairs of pendants are secured within the boom insert 300 through conventional means such as by clamps, straps, fasteners, and the like.

Figure 11:
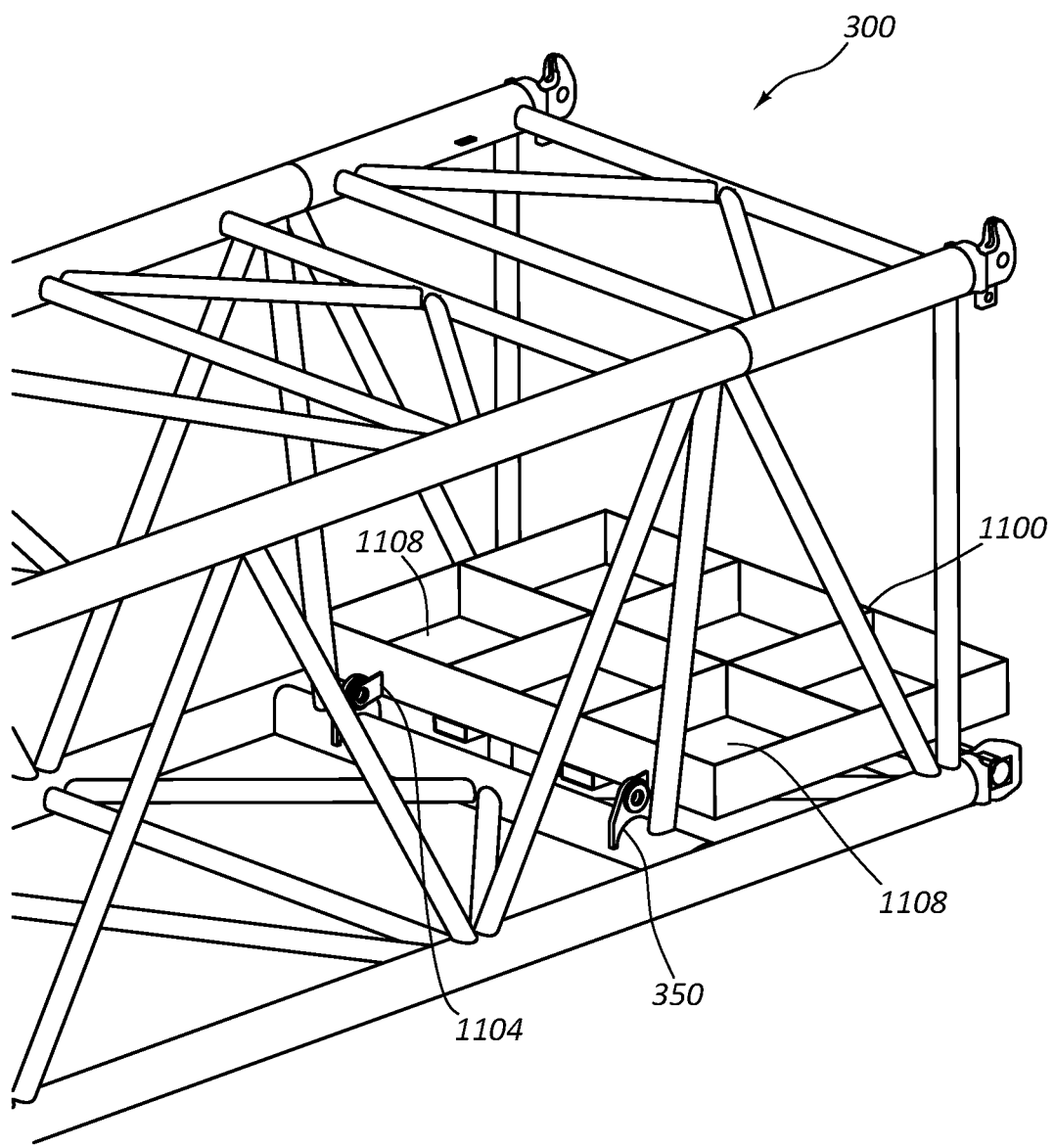
FIG. 11 illustrates the boom insert of FIG. 3 with a box for storing pendants in the boom insert.

FIG. 11 illustrates the boom insert of FIG. 3 with a box 1100 for storing pendants during transport of the boom insert 300. The box 1100 has two tabs 1104 extending from a side of the box 1100. The tabs 1104 have a distance between their outer faces that is less than the distance between the tabs 350 on the lower cross member 346 such that the tabs 1104 of the box 1100 fit between the tabs 350 of the lower cross member 346. A pin is inserted into the aperture of the lower cross member tabs 350 and into an aperture of the tabs 1104 of the box 1100 to secure the box 1100 to the boom insert 350. The box 1100 is divided into a series of compartments 1108 for storing a pendant. In the embodiment of FIG. 11, the pendants are flexible and are coiled for storage. Once coiled, they are placed in a compartment 1108 of the box 1100. The box 1100 shown in FIG. 11 has 6 compartments 1108, and each compartment 1108 houses a pair of pendants for a total of 6 different possible lengths. Or other embodiments each compartment 1108 holds a single pendant such that three pairs of pendants are stored in the box 1100. Other quantities of compartments 1108 are possible and the storage of the pendants may be mixed, with some compartments 1108 holding a single pendant and other holding more than one pendant. In some embodiments, a cover (not shown) is secured over the box 1100 to close the compartments 1108 holding the pendants. During use of the boom insert 300, the box 1100 may be removed from the boom insert 300.

Referring back to FIG. 3, a suspension assembly section 362 is stored on the boom insert 300. The suspension assembly section 362 includes a first strap assembly 363 and a second strap assembly 364. Each of the strap assemblies 363, 364 includes a first strap segment 365, a second strap segment 366, and a three-way connector 367. A first end of the first strap segment 365 is coupled to the three-way connector 367 and a first end of the second strap segment 366 is coupled to the three-way connector 367. A second end of the first strap segment 365 has a connector for connecting to an adjacent component. A second end of the second strap segment 366 has a connector for connecting to an adjacent component. The second ends of the strap segments 365, 366 are configured to connect directly to an adjacent strap. In other embodiments, they are configured to connect to an adjacent strap through a connector plate. The strap assemblies 363, 364 may be secured to the boom segment 300 for transportation and storage using commonly available components, such as clamps, straps, fasteners, and the like.

Figure 5:
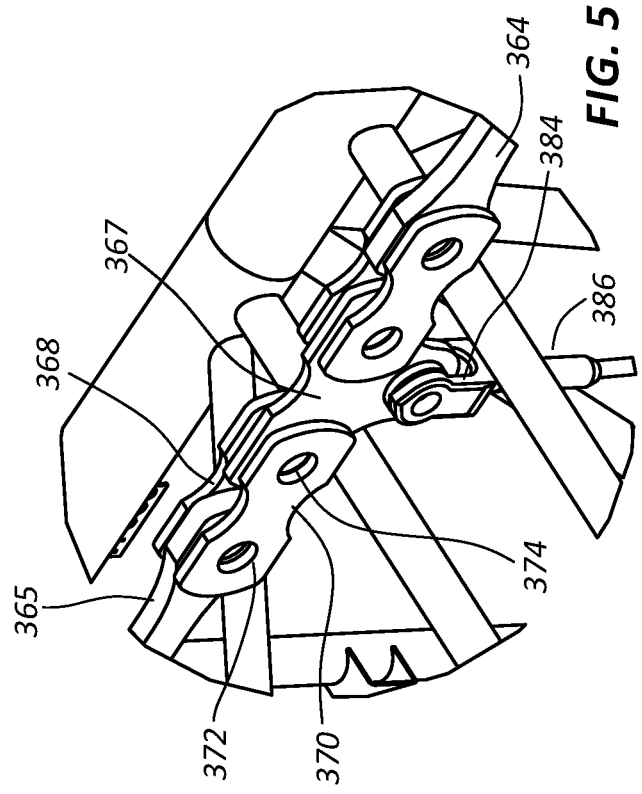
FIG. 5 illustrates a detailed perspective view of the top end of the pendant being connected to the suspension assembly segment of FIG. 4.

FIG. 5 illustrates a detailed view of the first and second strap segments 363, 364 of first strap assembly 363 connected to the three-way connector 367. The first end of each strap segment 363, 364 has an aperture sized and shaped to receive a pin. The three-way connector 367 has a thickness that is similar to a thickness of the strap segments 363, 364. Three apertures are disposed in the three-way connector 367 with each aperture sized and shaped to receive a pin. A pair of connector plates 368, 370 is disposed about the first end of a strap segment 363 with an aperture 372 of the connector plates 368, 370 aligning with the aperture of the strap segment 363. A pin (not shown) is inserted through the aperture 372 of the connector plates 368, 370 and the aperture of the first end of the strap segment 363, coupling the strap segment 363 to the connector plates 368, 370. The connector plates 368, 370 are positioned on each side of the three-way connector 367 with a second aperture 374 of the connector plates aligned with an aperture of the three-way connector 367. A pin (not shown) is inserted through the aperture 374 of the connector plates 368, 370 and through the aperture of the three-way connector 367, coupling the connector plates 368, 370 to the three-way connector 367. The process is repeated for the remaining strap segment 364 such that two strap segments 363, 364 are coupled to the three-way connector 367. With the strap segments 363, 364 coupled to the three-way connector 367, the strap assembly 363 is ready to be used in a suspension assembly such as suspension assembly 36 and suspension assembly 62 as illustrated in FIG. 1 and FIG. 2 respectively.

Figure 4:
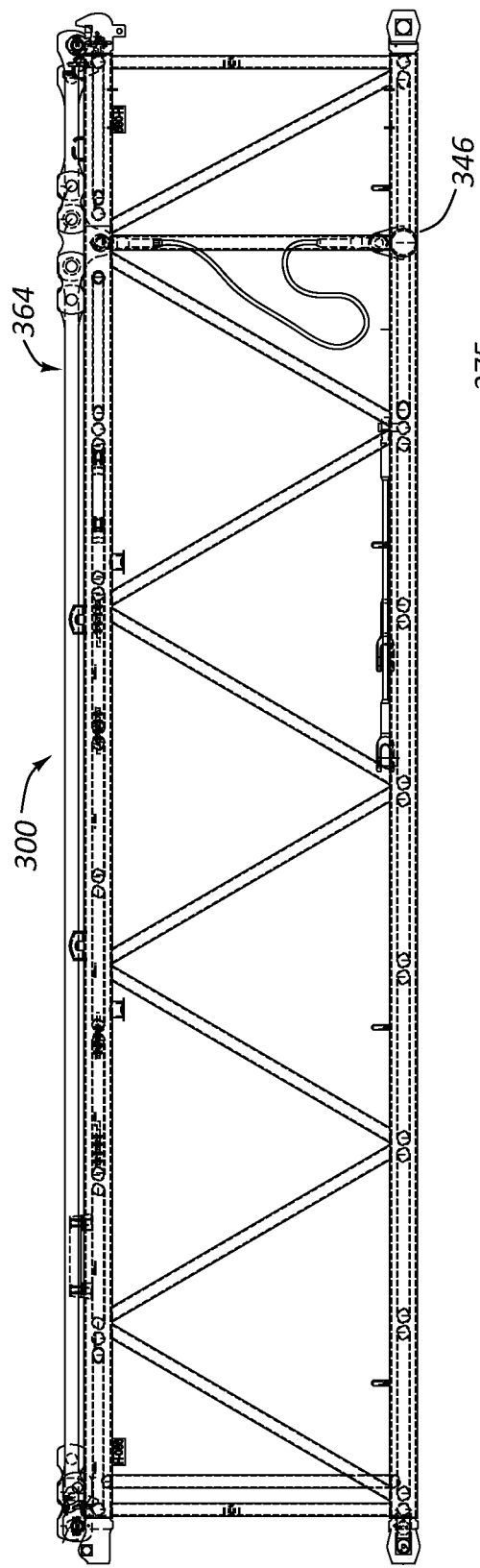
FIG. 4 illustrates a side view of the boom insert of FIG. 3 showing a pendant connecting the boom insert and a suspension assembly segment.
Figure 6:
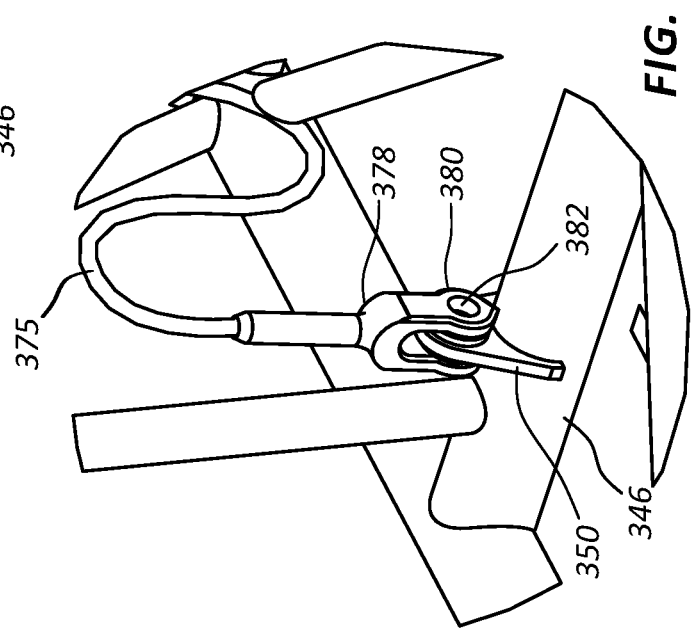
FIG. 6 illustrates a detailed perspective view of the bottom end of the pendant being connected to the boom insert of FIG. 3.

FIG. 4 illustrates a side view of an embodiment of the boom insert 300 of FIG. 3 having a pendant 360 coupled to the lower cross member 346 and to a strap assembly 364. FIG. 5 illustrates a detailed view of connection of the pendant 360 to the three-way connector 367, while FIG. 6 illustrates a detailed view of the pendant 360 coupled to the tab 350 of the lower cross member 346. In this embodiment the pendant 360 is a flexible rope tensioning member 376. The flexible rope tensioning member 376 has a connector 378 at each end with a parallel tab pair 380 having an aperture 382. The parallel tab pair 380 is spaced apart by a distance greater than a width of the tab 350 on the lower cross member 346 and the width of the three-way connector 367.

As illustrated in FIG. 6, the connector 378 at the lower end of the pendant 360 is coupled to the lower cross member 346 by placing the tab pair 380 over the tab 350 of the lower cross member 346 such that the aperture of the tab pair 380 aligns with the aperture of the tab 350 of the lower cross member 346. A pin (not shown) is then inserted through the apertures coupling the pendant 360 to the lower cross member 346.

As illustrated in FIG. 5, the upper end of the pendant 360 is coupled to the three-way connector 367 by a tab pair 384 of the upper connector 386 that overlies the three-way connector 367 and is aligned with the aperture of the tab pair 384 and with an available aperture of the three-way connector 367. A pin 387 is inserted though the apertures coupling the pendant 360 to the three-way connector 367.

Figure 7:
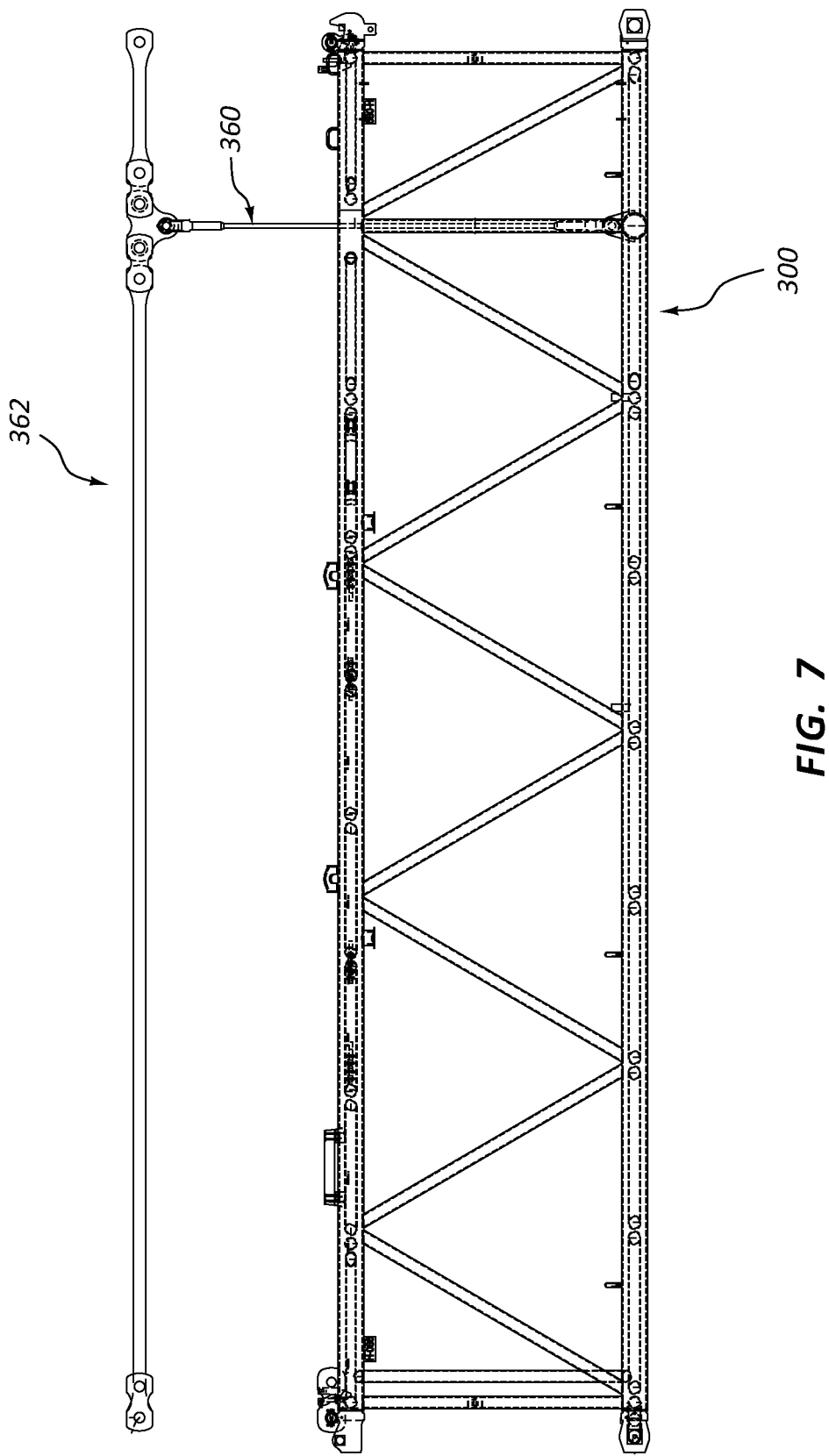
FIG. 7 illustrates a side view of the boom insert of FIG. 3 and suspension assembly segment with the suspension assembly segment being raised.

FIG. 7 illustrates the boom insert 300 of FIG. 4 with the suspension assembly section 362 being coupled to the boom insert 300 through pendant 360. The suspension assembly section 362 is shown elevated above the boom insert 300 with the pendant 360 being stretched between the suspension assembly section 362 and the boom insert 300. This occurs when the mobile crane lifts the boom by reeving in the boom hoist line, tensioning the suspension assembly section 362 causing it to lift from the boom insert 300 as shown in FIG. 7. The suspension assembly section 362 lifts the boom insert 300 through the pendant 360 as the mobile crane lifts the boom. Different lengths of pendants are used to adjust the height the suspension assembly section 362 rises above the boom insert 300 before lifting the boom insert 300. Typically, when the boom insert 300 is used near the hoist end of the boom, a shorter pendant is used compared to when the boom insert 300 being used farther from the hoist end of the boom.

Figure 8:
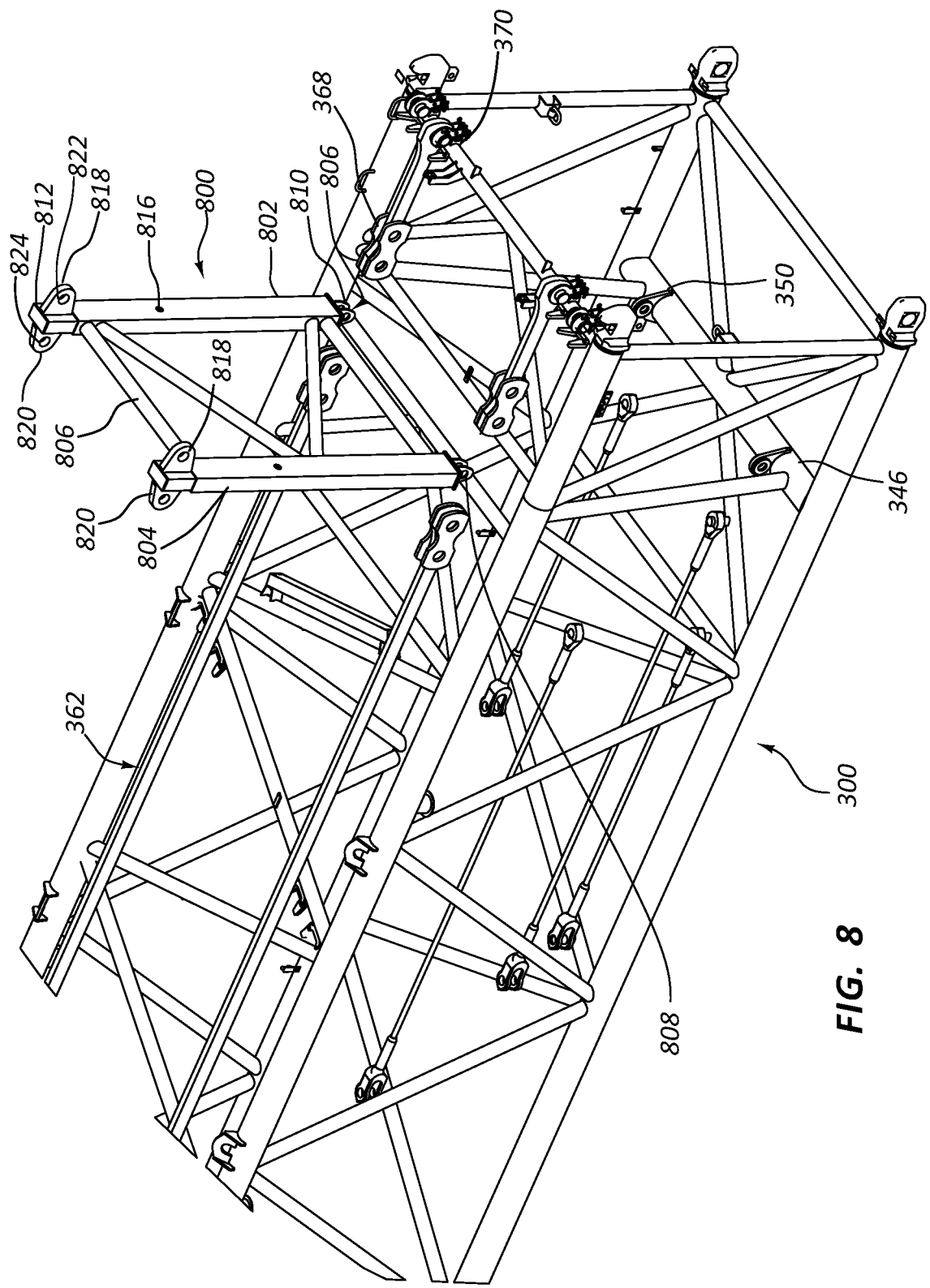
FIG. 8 illustrates a perspective view of the boom segment of FIG. 3 with an alternative pendant assembly.
Figure 9:
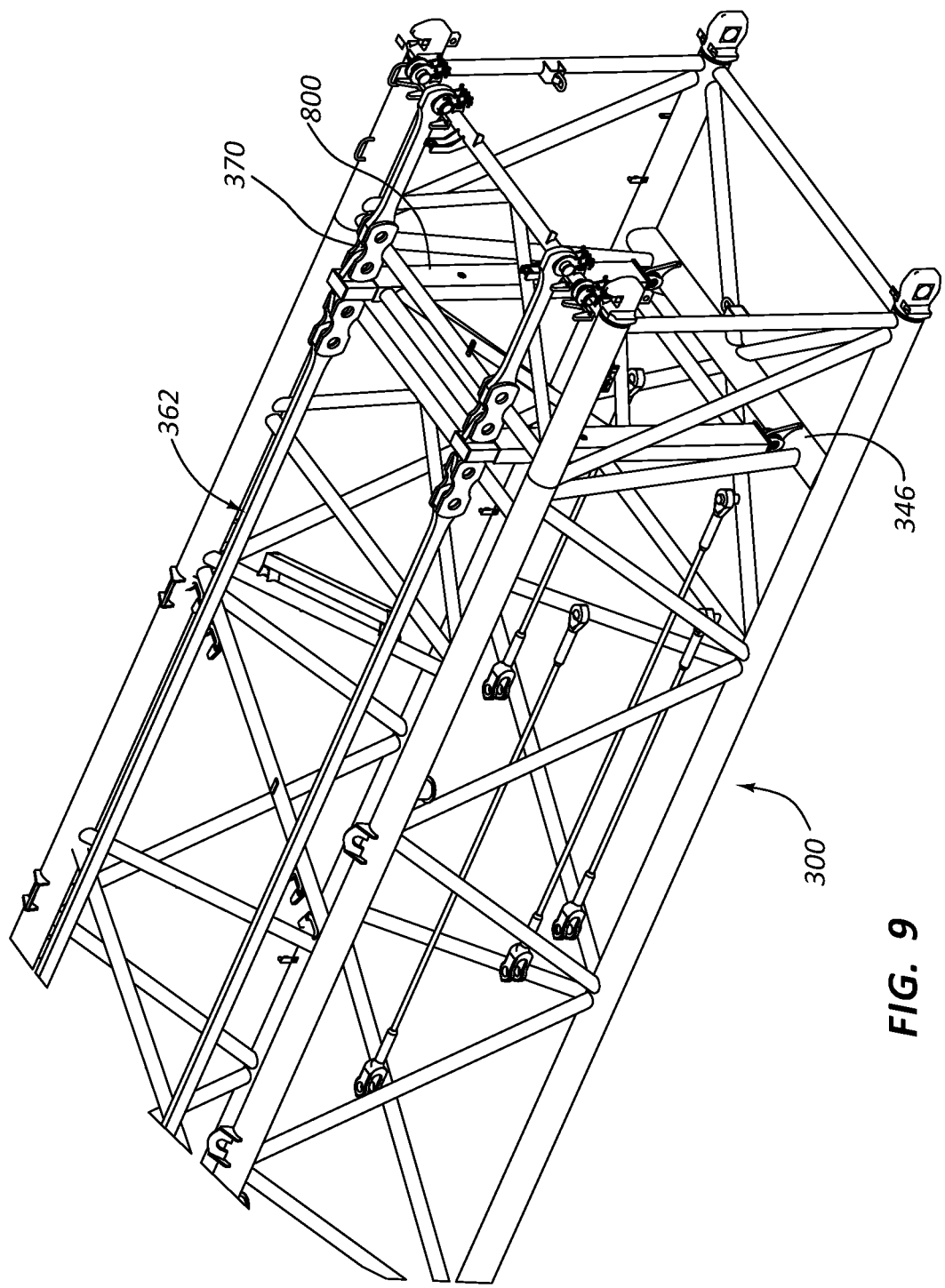
FIG. 9 illustrates a perspective view of the boom insert of FIG. 8 showing the alternative pendant assembly being coupled to the boom insert and the suspension assembly segment.

FIG. 8 illustrates the boom insert 300 of FIG. 3 with an alternative pendant assembly 800. The pendant assembly 800 has two vertical posts 802, 804 coupled by cross bracing 806. A lower end of each vertical post 802, 804 has a connector 806 for coupling to the lower crossbar 346 of the boom insert 300. The connector 806 is a tab pair 808 spaced apart by at last the thickness of the tab 350 of the lower cross member 346. The tab pair 808 has an aperture 810 sized and shaped to receive a pin. As shown in FIG. 9, in use the tab pair 810 is placed over the tab 350 of the lower cross member 346 such that the aperture 810 of the tab pair 808 is aligned with the aperture of the tab 350 of the lower cross member 346. A pin (not shown) is inserted through the apertures 810 to couple the pendant assembly 800 to the boom insert 300.

Each of the vertical posts 802, 804 has a longitudinal cavity disposed in an upper end of the post. The longitudinal cavity is sized and shaped to receive a post insert 812 in a slidable connection. A post insert 812 is disposed in the longitudinal cavity. A retention mechanism retains the post insert 812 within the longitudinal cavity. Thus the post insert 812 is free to move vertically within the longitudinal cavity, but the retention mechanism prevents the post insert 812 from leaving the longitudinal cavity completely. In some embodiments, the retention mechanism is a vertical slot 814 (not shown in the figure) in the post insert 812 and a corresponding pin 816 extending from the vertical post 802 into the vertical slot 814. In other embodiments, the retention mechanism is an enlarged lower portion of the post insert 812 and a narrowed upper portion of the post cavity, a mechanical interference preventing the post insert 812 from escaping the post cavity, or any other retention mechanism.

The post insert 812 has an upper end having a fastener for coupling to a strap assembly. In some embodiments, the upper end has a tab pair that function as previously described with relation to the flexible pendant upper connector 384. In such embodiments the upper connector 384 couples to the existing three-way connection 367. In other embodiments, the upper end of the post insert 812 has two tabs 818, 820 extending from the post insert 802 with each of the tabs 818, 820 having an aperture 822, 824 sized and shaped to receive a pin. In such embodiments the three-way connector is not necessary and the connection plates 368, 370 are connected directly to the pendant assembly 800 by inserting a pin through the aperture of the connection plates 368, 370 and the aperture 822, 824 of a tab 818, 820 on the post insert 812.

Figure 10:
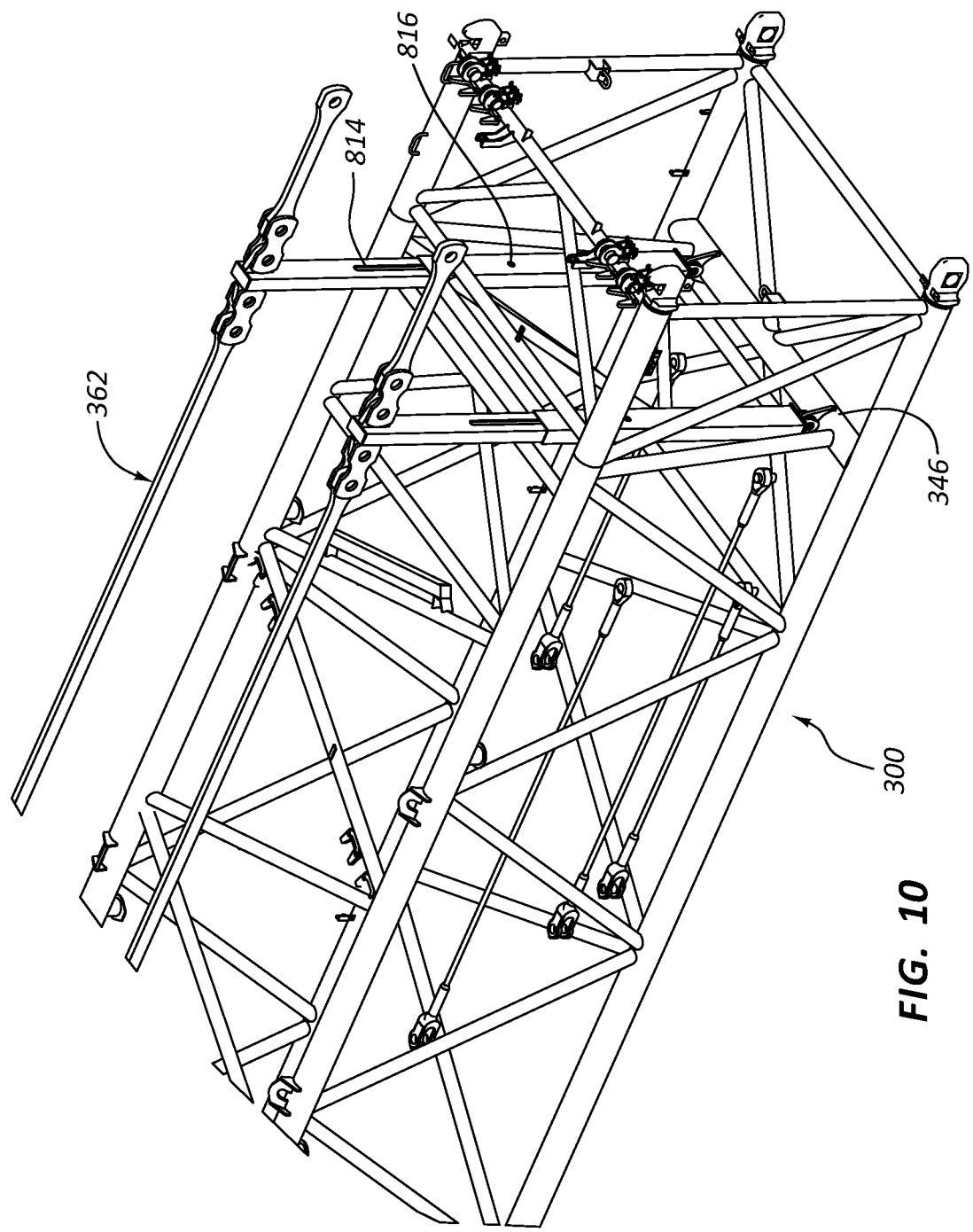
FIG. 10 illustrates a perspective view of the alternative pendant assembly of FIG. 8 being extended with the suspension assembly segment being raised.

FIG. 10 illustrates the boom insert of FIG. 3 with the pendant assembly of FIGS. 8 and 9. The suspension assembly section 362 is shown elevated above the boom insert 300 with the pendant assembly 800 being extended between the suspension assembly section 362 and the boom insert 300. The tension in the suspension assembly section 362 lift the boom insert 300 as shown in FIG. 10 when a mobile crane lifts the boom. The suspension assembly section 362 lifts the boom insert 300 through the pendant assembly 800 as the mobile crane lifts the boom. Different lengths of pendants assemblies' may be used to adjust the height the suspension assembly section 362 rises above the boom insert 300 before lifting the boom insert 300. In other embodiments, the retention mechanism may be adjustable to control the length that the post inserts 802, 804 rise above the boom insert 300. For instance, when the retention mechanism is a slot 814 in the post insert 802, 804 and a pin 816 extending into the slot 814, the pin 816 may have different locations in which it may be inserted to adjust the height that the suspension assembly section 362 rises.

FIGS. 12a and 12b illustrate another embodiment of an boom insert 1201 having intermediate connection disposed between a first end 1205 and a second end 1206 of the insert 1201. The insert 1201 has an attachment mechanism disposed on each end 1205, 1206. The attachment mechanism includes tabs and apertures as described previously with respect to FIG. 3. Other connection types are possible such as hooks, bolts, clamps, and the like. The insert 1201 is similar in structure to the embodiment of FIG. 3 and like elements will not be repeated.

The insert 1201 has a cross member 1207 coupled to a first lower shaft 1208 and a second lower shaft 1209. The cross member 1207 has a first sheave 1210 and a second sheave 1211 mounted thereto. The first sheave 1210 and the second sheave 1211 rotate about the cross member 1207. A pendant assembly 1212 has a first flexible pendant 1213 and a second flexible pendant 1214 connected by a cross pendant 1215. The first pendant 1213 couples to the first lower shaft 1208 at a first intermediate connection 1203, and the second pendant 1214 couples to the first lower shaft 1209 at a second intermediate connection 1204. In the embodiment of FIG. 12a, each lower shaft has additional intermediate connections such as intermediate connection 1216 and intermediate connection 1217. The first pendant 1213 and the second pendant 1214 are configured to couple to any of the intermediate connections. By changing the intermediate connection to which the pendants connect, the effective length of the pendant is varied.

FIGS. 13a and 13b depict another embodiment of an insert 1301 having an intermediate connection in the form of a drum disposed between a first end 1305 and a second end 1306 of the insert 1301. The insert 1301 has an attachment mechanism disposed on each end 1305, 1306 for attachment to an adjoining insert. The attachment mechanism includes tabs and apertures as described previously with respect to FIG. 3. Other connection types are possible such as hooks, bolts, clamps, and the like. The insert 1301 is similar in structure to the embodiment of FIG. 3 and like elements will not be repeated.

The insert 1301 has a cross member assembly 1307 coupled to a first lower shaft 1308 and a second lower shaft 1309. The cross member assembly 1307 has a first drum 1310 and a second drum 1311. Each drum 1310, 1311 has an associated flexible pendant 1312 that wraps around the drum 1310, 1311 and is coupled to drum 1310, 1311. A free end 1313 of the flexible pendant 1312 extends away from the drum 1310, 1311 and is configured to connect to a suspension assembly. The drum 1310, 1311 is rotated to adjust the length of the flexible pendant 1312 extending from the drum 1310, 1311. In some embodiments, the drum 1310, 1311 is manually rotated and has a brake to hold the drum 1310, 1311 in place when the desired length of flexible pendant 1312 is extended. In other embodiments, the drum 1310, 1311 is a powered drum rotated by an electric actuator such as a motor, a hydraulic actuator such as a hydraulic drive, or a mechanical connection.

Figure 14A:
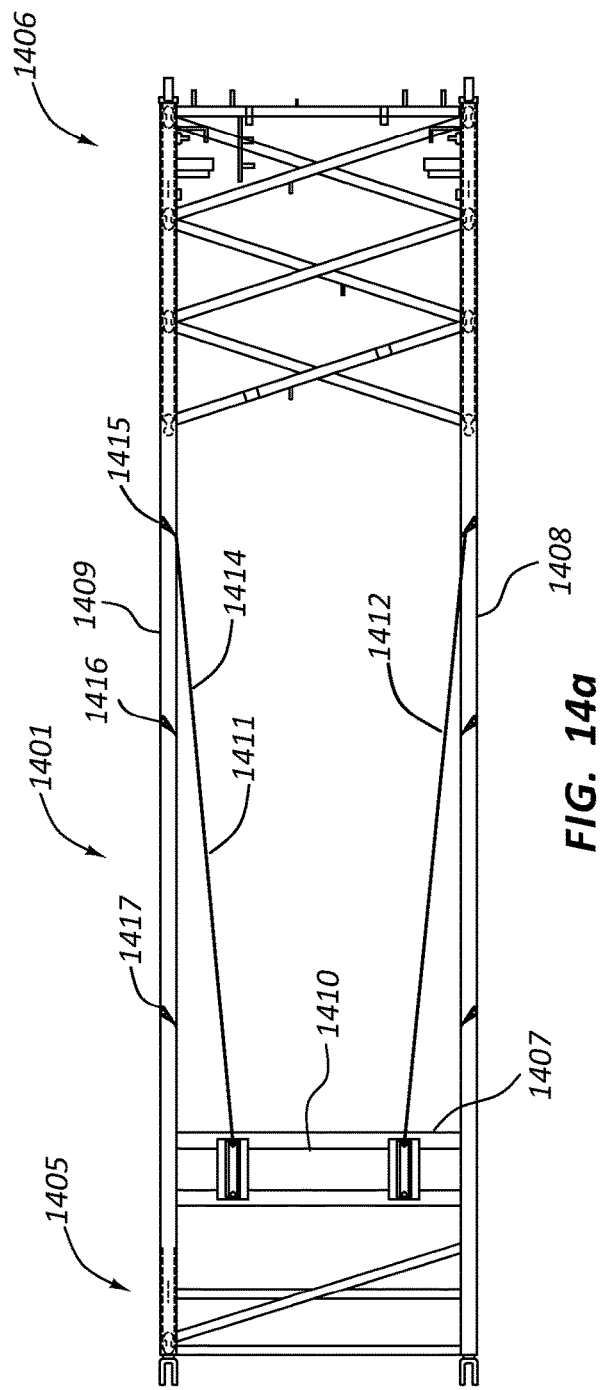
FIG. 14a illustrates a top view of an alternative embodiment of an insert.
Figure 14B:
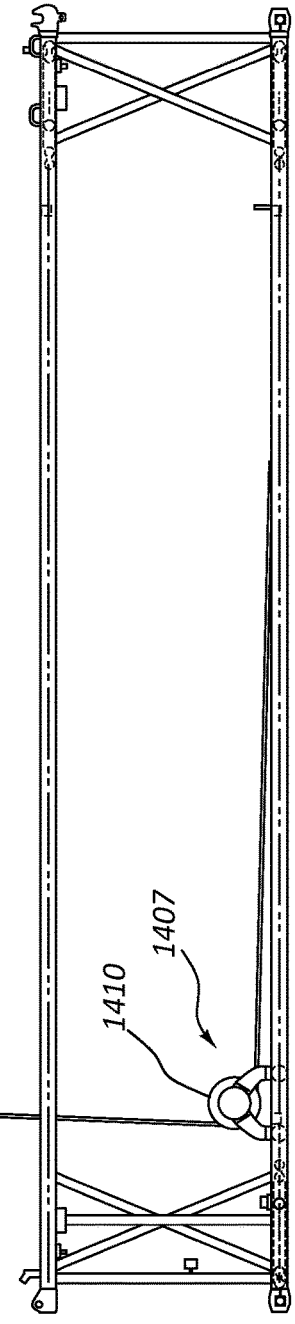

FIGS. 14a and 14b depict another embodiment of an insert 1401 having an intermediate connection disposed between a first end 1405 and a second end 1406 of the insert 1401. The insert 1401 has an attachment mechanism disposed on each end 1405, 1406 for attachment to an adjoining insert. The attachment mechanism includes tabs and apertures as described previously with respect to FIG. 3. Other connection types are possible such as hooks, bolts, clamps, and the like. The insert 1401 is similar in structure to the embodiment of FIG. 3 and like elements will not be repeated.

The insert 1401 has a cross member assembly 1407 coupled to a first lower shaft 1408 and a second lower shaft 1409. The cross member assembly 1407 has a cylindrical capstan 1410 having a first flexible pendant 1411 and a second flexible pendant 1412 wrapped about the cylindrical capstan 1410. The flexible pendants 1411, 1412 a first free end 1413 of the flexible pendants 1411, 1412 extends away from the capstan 1410 and has an end connection for connecting to a suspension assembly. A second free end 1414 of the flexible pendants 1411, 1412 extends away from the capstan along a lower side of the insert and is coupled to either the first lower shaft 1408 or the second lower shaft 1409. The lower shafts 1408, 1408 each have multiple connections 1415, 1416, 1417 at which the second end of the flexible pendant 1411, 1412 may attach. By adjusting the position at which the second free end 1414 of the flexible pendant 1411, 1412 attaches to the lower shafts 1408, 1409, the extended length of the first free end 1413 is adjusted. Additionally, the length of the first free end 1413 of the flexible pendant 1411, 1412 is adjustable by changing the number of wraps of the flexible pendant 1411, 1412 around the capstan 1410.

Figure 15A:
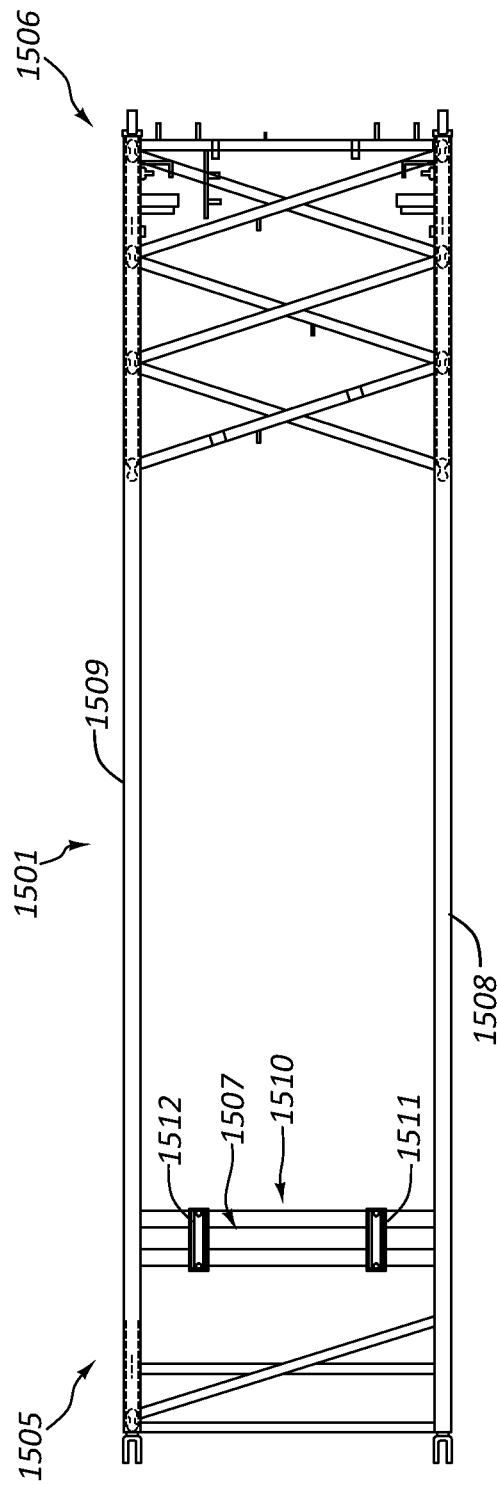
FIG. 15a illustrates a top view of an alternative embodiment of an insert.
Figure 15B:
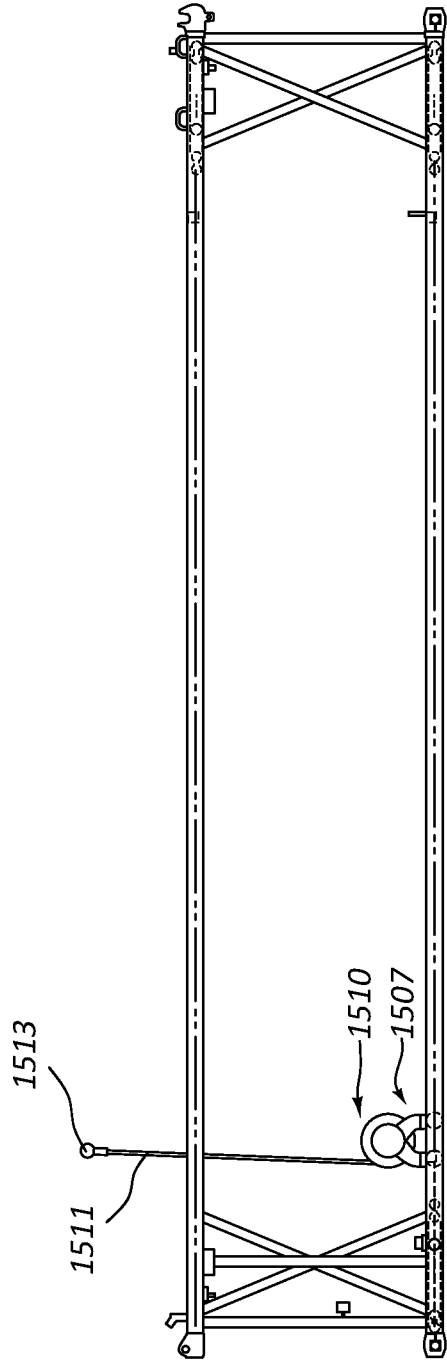

FIGS. 15a and 15b depict another embodiment of an insert 1501 having an intermediate connection disposed between a first end 1505 and a second end 1506 of the insert 1501. The insert 1501 has an attachment mechanism disposed on each end 1505, 1506 for attachment to an adjoining insert. The attachment mechanism includes tabs and apertures as described previously with respect to FIG. 3. Other connection types are possible such as hooks, bolts, clamps, and the like. The insert 1501 is similar in structure to the embodiment of FIG. 3 and like elements will not be repeated.

The insert 1501 has a cross member assembly 1507 coupled to a first lower shaft 1508 and a second lower shaft 1509. The cross member assembly 1507 has a cylindrical capstan 1510 having a first flexible pendant 1511 and a second flexible pendant 1512 wrapped about the cylindrical capstan 1510. A free end 1513 of the flexible pendants 1511, 1512 extends away from the capstan 1510 and has an end connection for connecting to a suspension assembly. An opposite end of the flexible pendants 1511, 1512 is coupled to the capstan 1510. The length of the free end 1513 of the pendants 1511, 1512 is adjusted by changing the number of wraps the flexible pendants 1511, 1512 wrap around the capstan 1510.

Figure 16:
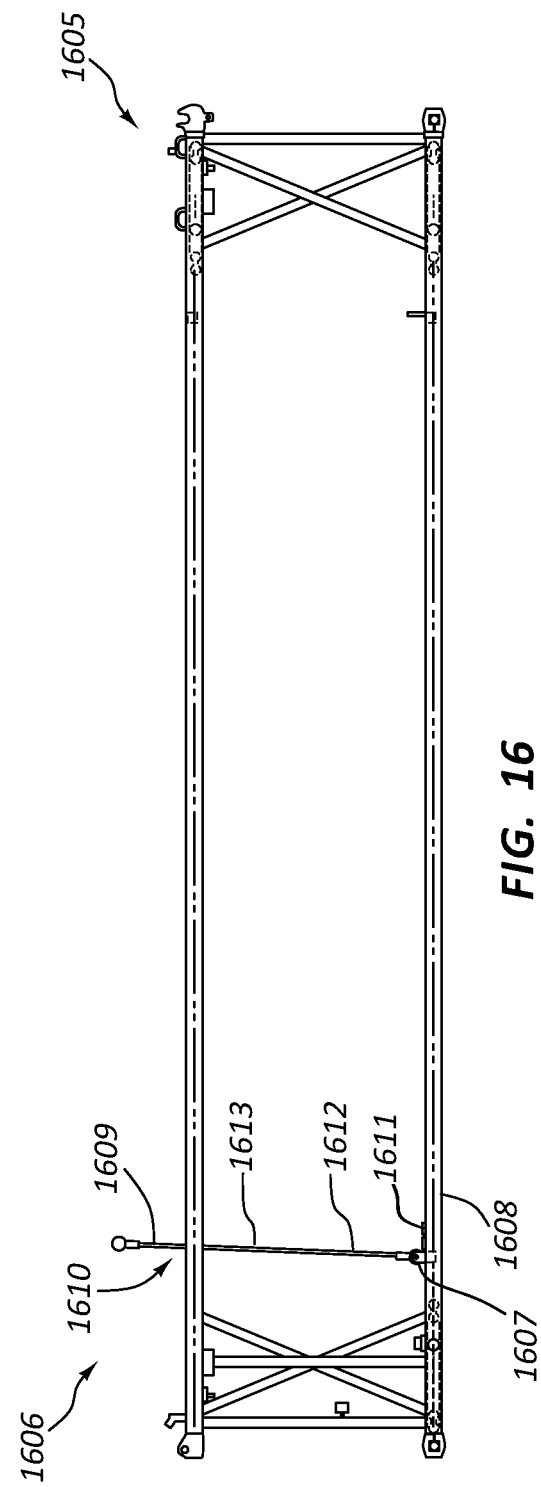
FIG. 16 illustrates a side view of an alternative embodiment of an insert.

FIG. 16 depicts another embodiment of an insert 1601 having an intermediate connection disposed between a first end 1605 and a second end 1606 of the insert 1601. The insert 1601 has an attachment mechanism disposed on each end 1605, 1606 for attachment to an adjoining insert. The attachment mechanism includes tabs and apertures as described previously with respect to FIG. 3. Other connection types are possible such as hooks, bolts, clamps, and the like. The insert 1601 is similar in structure to the embodiment of FIG. 3 and like elements will not be repeated.

The insert 1601 has a cross member 1607 coupled to a first lower shaft 1608 and a second lower shaft 1650. Flexible pendants 1609, 1651 connect to the cross member 1607 and have free end 1610, 1652 that extends away from the cross member 1607 towards a suspension assembly. The flexible pendants 1609, 1651 have a plurality of buttons 1611, 1612, 1613, or areas of enlarged cross section that secure within a connection on the cross member 1607 as will be described below. The buttons 1611, 1612, 1613 are set at a fixed length and depending on the particular button that is used to secure the flexible pendants 1609, 1651 the effective length of the flexible pendants 1609, 1651 is adjusted.

Figure 17:
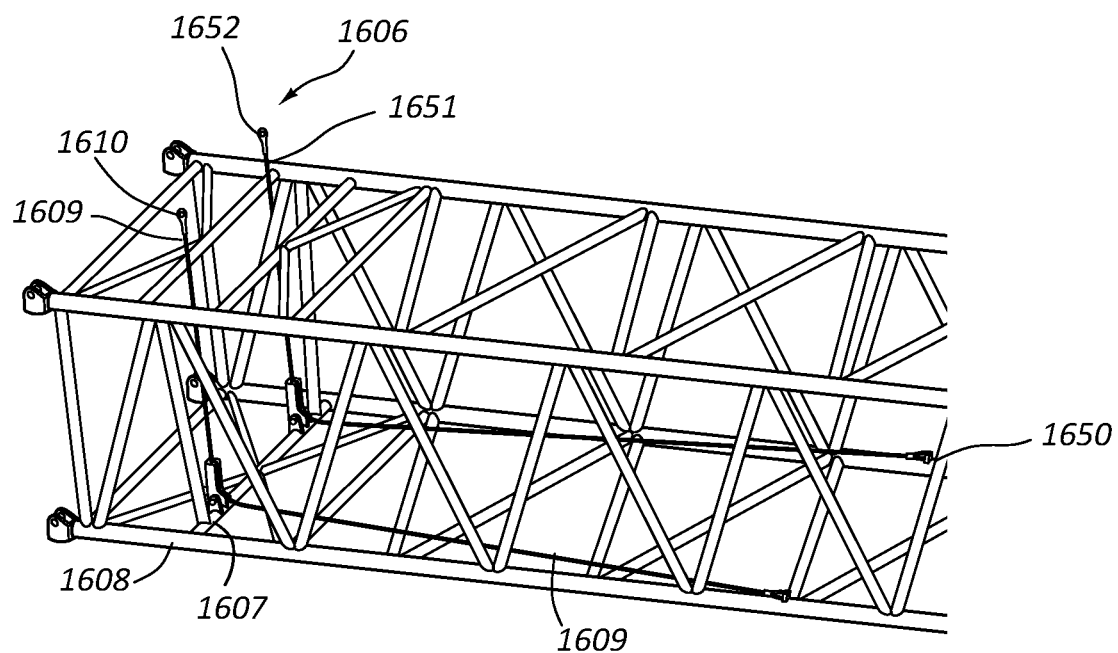
FIG. 17 illustrates a perspective view an end of the inset of FIG. 16.
Figure 18:
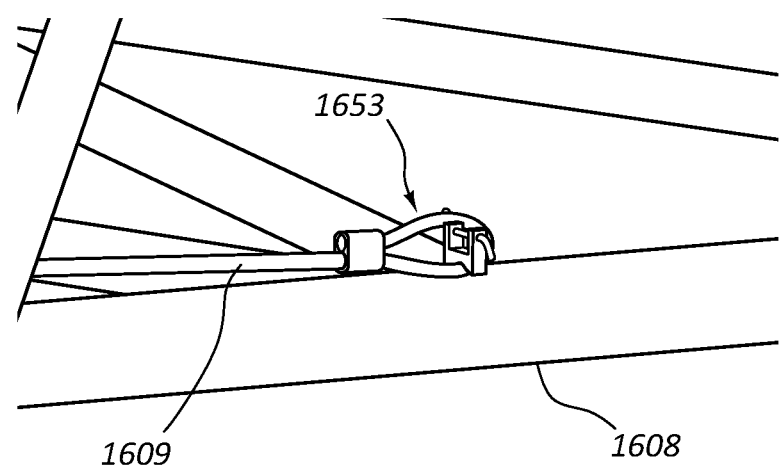
FIG. 18 illustrates a detailed view of the embodiment of FIG. 16 showing an end connection of a flexible pendant.

FIG. 17 illustrates a perspective view of the second end 1606 of the insert 1601 of FIG. 16 showing the flexible pendants 1609, 1651. FIG. 18 is a detailed view of a flexible pendant 1609 position along the first shaft 1609 and have a free end 1653 attached to the first shaft 1609. The first shaft 1609 has multiple locations in which the free end 1653 is attached depending on the length of the flexible pendant.

Figure 19:
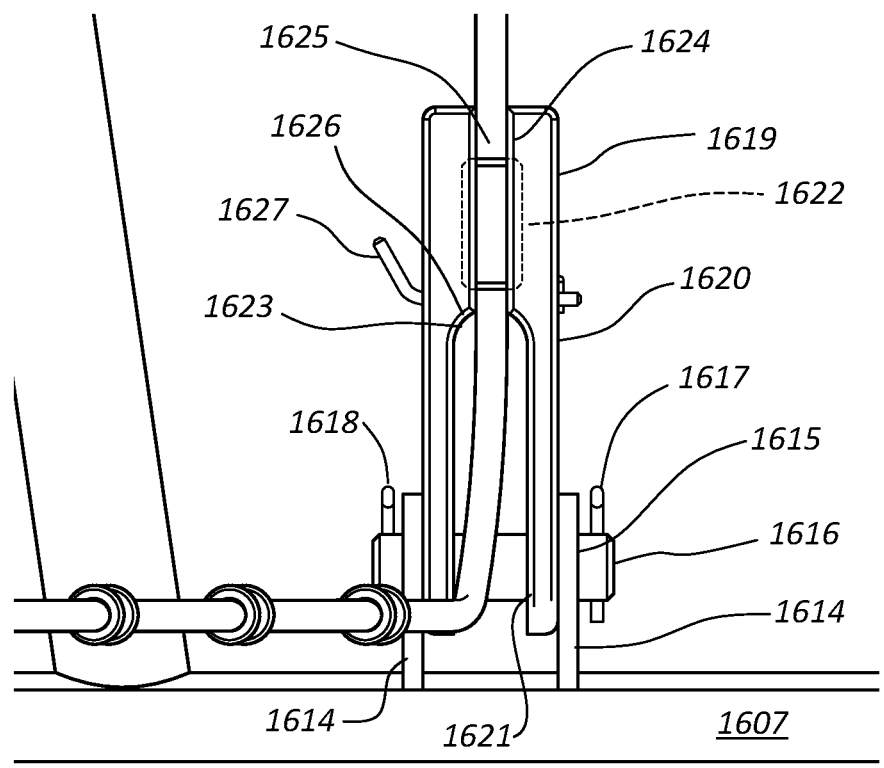
FIG. 19 illustrates a detailed view of the embodiment of FIG. 16 showing a connection of a flexible pendant.
Figure 20:
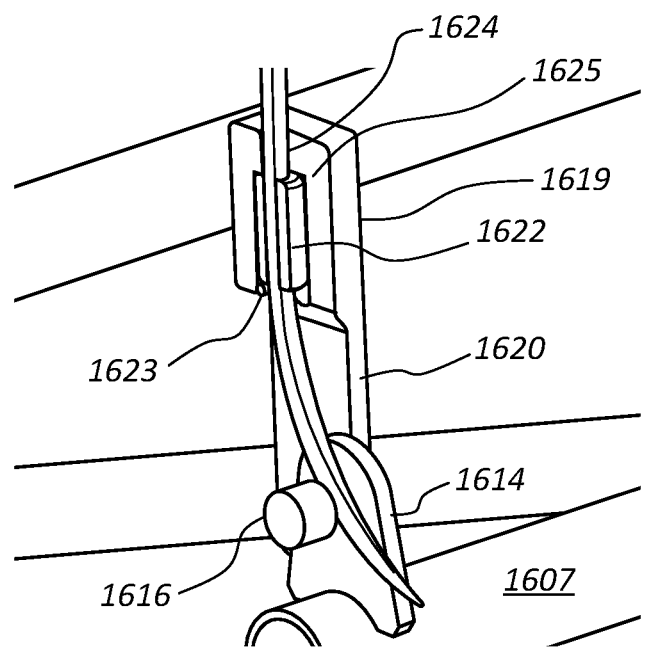
FIG. 20 illustrates a detailed view of the embodiment of FIG. 16 showing a detailed cross section of a connection of a flexible pendant.

FIG. 19 illustrates a detailed view of the connection of FIG. 16 and its interaction with the buttons 1611, 1612, 1613 of the flexible pendant 1609. FIG. 20 is a detailed cross section of the connection of FIG. 16. Referring to FIG. 20, the connection has tab pair 1614 that is coupled to the cross member 1607 through a conventional means such as welding. The tab pair 1614 has an aperture 1615 through which a pin 1616 is inserted. The pin 1616 has a length greater than an external width of the tab pair 1614 such that the pin 1616 extends from both sides of the tab pair 1614 when it is inserted. A first cotter pin 1617 and a second cotter pin 1618 secures the pin 1616 within the aperture 1615 of the tab pair 1614. In other embodiments, the pin 1616 has a threaded end and is threaded within the aperture 1615 or threaded into a nut outside of the tab pair 1614.

A socket 1619 has two legs 1620 with apertures 1621 that are similar to the aperture 1615 of the tab pair 1614. In use, the legs 1620 are placed in the space between each tab of the tab pair 1614 such that the apertures 1615 of the tab pair 1614 and the apertures 1621 of the legs 1620 are aligned. The pin 1616 is then inserted through the apertures 1615, 1621 securing the socket 1619 to the tab pairs 1614. In other embodiments, the legs 1620 have an internal spacing wider than the outer width of the tab pair 1614 such that in use the tab pair 1614 fits between the legs 1620.

The socket 1619 of FIG. 20 is shown cut away so that the interaction of the button 1622 and the socket 1619 can be seen. The socket 1619 has a recess 1623 having an internal diameter that is larger than an external diameter of the button 1622. At one end of the recess 1623, there is a portion 1624 having a reduced diameter that is larger than an external diameter of the flexible pendant 1609, but less than the outer diameter of the button 1623. A slot 1625 that is wider than the flexible pendant 1609, but narrower than the button 1623 is cut along one side of the socket 1619. Thus a portion of the flexible pendant 1609 between buttons may be inserted into the recess 1623 through the slot 1625. The flexible pendant 1609 is then be moved with the button 1622 sliding into the recess 1623. The button 1622 slides within the recess 1623 until the button 1622 reaches the reduced diameter portion 1624 of the recess. An aperture 1626 passes through the socket 1619 across the recess 1623 at a distance just past the length of the button 1622 such that when the button 1622 is placed in the recess 1623 a second pin 1627 inserted through the aperture 1626 locks the button 1622 within the recess 1623.

In an exemplary embodiment, the button 1622 is a sleeve swaged to the flexible pendant 1609. In an alternative embodiment, the button 1622 is an enlarged diameter portion created by a change in a weave pattern of the rope. The button 1622 is removed the recess 1623 by removing the second pin 1627 and sliding the button 1622 from the recess 1623. The flexible pendant 1609 can then be removed by sliding it out of the socket slot 1625. The effective length of the flexible pendant 1609 is adjusted by inserting different buttons within the recess 1623.

The flexible pendant of FIGS. 16 through 20 may be utilized as a tensioning member in embodiments other than as an intermediate suspension connection member. FIG. 21 illustrates a generic connector 2100 suitable for use with an adjustable length tensioning member. In use, the generic connector 2100 is coupled to a crane component requiring a tensioned connection to another crane component. Component 2102 may be a boom insert as described previously, or it may be a component such as a chassis, mast, rotating body, hoist, jib, bed, or other crane component. While component 2102 is shown as a tubular member, it could be a planar surface, or other component surface.

The component 2102 has a first tab 2104 and a second tab 2106 coupled to the component 2102. The first tab 2104 and the second tab 2106 may be a separate structure connected to the component 2102 through conventional techniques such as a weld, or the first tab 2104 and the second tab 2106 could be an integral part of the component 2102. The first tab 2104 and the second tab 2106 each have a tab aperture (not visible in FIG. 21) in line with one another sized and shaped to receive a pin 2210. the tabs 2104, 2106 extend away from the surface of the component 2102 to offset the tab apertures from the surface of the component 2102.

A socket 2112, which will be described in more detail in FIGS. 22 a through 22d, is disposed with a portion of the socket 2112 between the tabs 2104, 2106. The socket 2112 has a socket aperture 2108 sized and shaped to receive the pin 2210. When assembled, the socket aperture 2108 is aligned with the tab apertures and the pin 2210 is inserted through the tab apertures and the socket aperture 2210, securing the socket 2112 in a rotating connection about the axis of the pin 2210. The pin 2210 is enlarged at one end preventing it from passing completely through the aperture and the other end of the pin 2210 receives a cotter pin to prevent the pin 2210 from sliding back out of the tab aperture.

FIGS. 22a through 22d illustrate the socket 2212 in greater detail. The socket 2212 has a first end having the socket aperture 2108 for receiving the pin 2210 and a second end having a recess 2214 for receiving a rope connector 2215 (shown in FIG. 23). The first end is forked with a first leg 2216 and a second leg 2218 having a space there between. The spacing between the legs 2216, 2218 enables a rope to be threaded into the recess 2214. In other embodiments, a single leg may be present.

FIG. 22c illustrates a section view of the socket 2212 taken along section AA of FIG. 22b. The section view illustrates the second end of the socket 2212 and the recess 2214 for receiving the rope connector 2215. The recess 2214 is sized and shaped to pass the rope connector 2215 there through and has a seat 2220 for receiving a button 2222 on the rope connector 2215. A first portion 2224 of the recess 2214 has a cross section complementary to the button 2222 secured to the rope connector 2215 and extends from the space between the legs 2216, 2218 towards an end face 2226 at the second end of the socket 2212. For ease of manufacturing, the cross section is be circular and the first portion 2224 is cylindrical. In other embodiments, the cross section is a different shape such as a square and the first portion has a complementary profile. The end of the first portion 2224 opposite the legs 2216, 2218 transitions into a second portion 2228 having a reduced diameter and extending through to the end face 2226. The transition from the first portion 2224 to the second portion 2228 forms the seat 2220 for receiving the button 2222. The reduced diameter is sized complementary to a diameter of the rope connector 2215 to allow the rope connector 2215 to pass through the second portion 2228, while minimizing play between the rope connector 2215 and the socket 2212.

FIG. 22d illustrates a section view of the socket 2212 taken along section BB of FIG. 22b. The section view further illustrates the recess 2214 and highlights an access slot 2230 formed along a side of the recess 2214. The access slot 2230 provides access from a side of the socket 2212 to the recess 2214 and extends the length of the recess 2214. The access slot 2230 has a width that is slightly greater than the diameter of the rope connector 2215, such that the rope connector 2215 may be placed into the recess 2214 by passing it through the access slot 2230.

FIGS. 23a and 23b (collectively "FIG. 23") illustrate the rope connector 2215 in greater detail. The rope connector 2215 includes a rope 2232 and a plurality of buttons 2222 fixed in position along the rope 2232 and having an enlarged diameter relative to the rope 2232. At a first end of the rope 2232, a first connector 2234 for connection to a crane component is disposed and a second end of the rope 2232 has a second connector 2236 for connection to crane component.

The plurality of buttons 2222 are secured at discreet positions along the rope 2232 such that the distance from the first connector 2234 to each button 2222 corresponds to a normal working distance of the rope 2232. For example, the embodiment shown in FIG. 23 has a first button 2237 ten feet from the first connector 2234, a second button 2238 eleven feet from the first connector 2234, a third button 2239 thirteen feet from the first connector 2234, a fourth button 2240 fourteen feet from the first connector 2234, a fifth button 2241 seventeen feet from the first connector 2234, a sixth button 2242 eighteen feet from the first connector, a seventh button 2243 nineteen feet from the first connector 2242, and an eighth button 2244 twenty-one feet from the first connector 2242. These distances are only given as an example, and other distances and numbers of buttons 2222 are possible.

The first connector 2234 is a typical pendant pin type connection as known in the art. The pendant pin connection is coupled to the rope 2232 and has a first tab and a second tab with an aperture for receiving a pin. A component, such as a boom insert or other crane component has at least one tab extending from the component. The first and second tab of the pendant are placed over the tab and a pin is inserted through the tab apertures to secure the rope connector 2215 to the component.

The second connector 2236 is a simple safety hook in the embodiment of FIG. 23, or in other embodiments the second connector 2236 is a traditional connector such as the first connector 2234. Because the load is carried by the buttons 2222, there is no need for the second connector 2236 to be designed to carry the same load as the first connector 2234. Instead, the second connector 2236 serves mainly as an attachment for securing the loose end of the rope connector 2215.

In the embodiment of FIG. 23, the buttons 2222 on the rope connector 2215 are a separate component secured to the rope connector 2215. In other embodiments, the buttons are an integral part of the rope 2232. For example, in some embodiments, the rope 2232 is woven to have an enlarged portion of fibers at discrete intervals. While this may be difficult with wire rope, newer synthetic fibers may be more easily woven into nontraditional patterns. The embodiment of FIG. 23 uses a separate component swaged to the rope 2232. In the swaging process, the buttons 2222 are placed over the rope 2232 at a desired location and then deformed to compress the button 2222. The swaging process secures the button 2222 to rope 2232 with a strength comparable to the strength of the rope 2232. Preferably, the buttons 2222 are then stamped or otherwise marked to indicate their location. In some embodiments, the buttons 2222 are marked with a single reference character, or in other embodiments, the buttons 2222 are marked with an actual representation of the length between the button 2222 and the first connection 2234.

Returning to FIGS. 21 through 23, in use the rope connector 2215 is secured to a first crane component using the first connector 2234 and the socket 2100 is secured to a second crane component as previously described. The socket 2100 is detachably secured using a removable pin. In other embodiments, the socket 2100 is permanently secured to the second crane component. Depending on the required length of the tensioning member, a portion of the rope 2232 not having a button 2222 is fed through the access slot 2230 and into the recess 2214. For example, if the required working length corresponded to the third button 2239, the rope 2232 between second button 2238 and the third button 2239 would be inserted through the access slot 2230. With the rope 2232 placed in the recess 2214, the rope 2232 is pulled through the second portion 2228 of the recess 2214 until the third button 2239 rests against the seat 2220. A retaining pin is then inserted into aperture 2111 retaining the third button 2239 within the recess 2214. With the third button 2239 retained in the recess 2214, the rope connector 2215 is able to provide a tensioning load between the first connector 2234 and the third button 2239.

Figure 24:
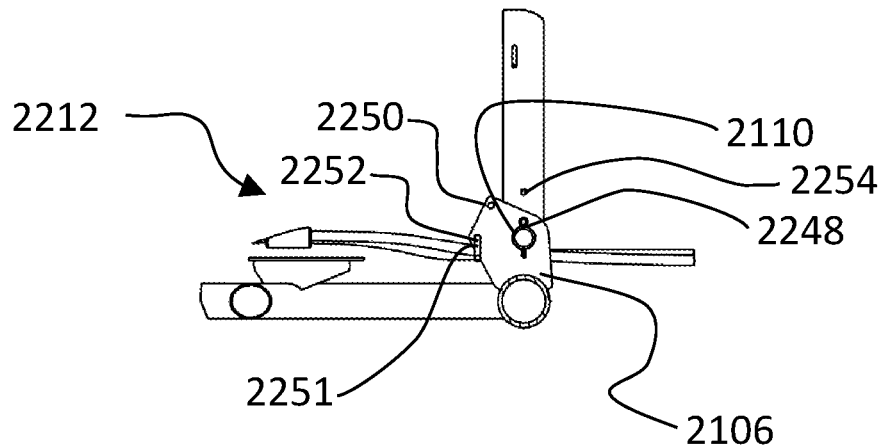
FIG. 24 illustrates an adjustable length tensioning assembly in a working configuration.
Figure 26:
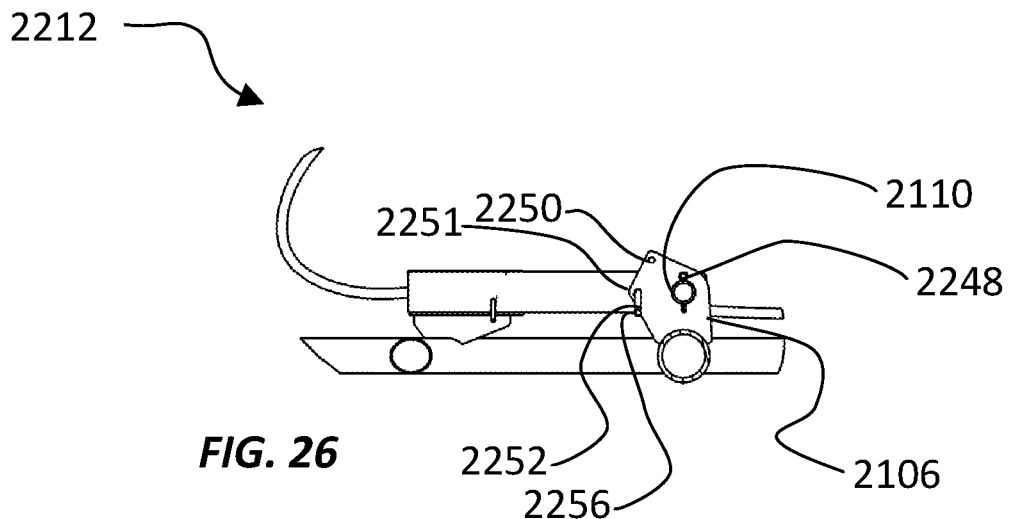
FIG. 26 illustrates an adjustable length tensioning assembly in a configuration suitable for transportation.

FIG. 24 illustrates an embodiment of a socket 2212 coupled to a crane component in a rotating configuration. The first tab 2106 and the second tab (not visible) extend away from a portion of the crane component. The first tab 2106 and the second tab have an aperture 2248 sized and shaped to receive pin 2110. The socket 2212 has a similar aperture sized and shaped to receive the pin 2210. With the socket 2212 located between the first tab 2106 and the second tab, the pin 2210 is inserted through the tab apertures 2248 and the socket aperture coupling the socket 2212 to the second crane component through the tabs 2106. The socket 2112 is able to rotate about the axis of the pin 2110 from the position shown in FIG. 24, to the position shown in FIG. 26. It may be beneficially for the socket 2212 to pivot such that a load traverse to the crane component will not introduce a side load onto the socket 2212 or the rope 2215.

Figure 25:
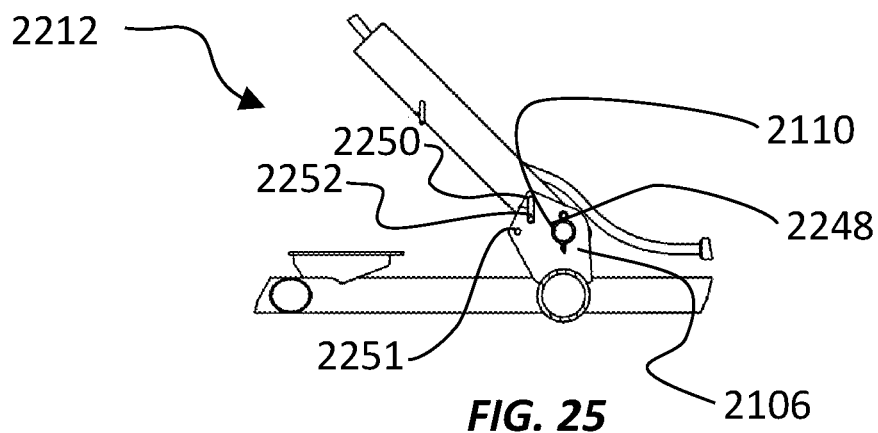
FIG. 25 illustrates an adjustable length tensioning assembly in a configuration suitable for assembly.

A first additional aperture 2250 and a second additional aperture 2251, both sized and shaped to receive a second pin 2252 is disposed in the tabs 2106. A complementary aperture 2254 is disposed in the socket 2212. The complementary aperture 2254 selectively aligns with the additional apertures 2250, 2251 depending on the position of the socket 2212. For example, with the socket 2212 in the position shown in FIG. 26, a pin 2256 is inserted through the second additional aperture 2251, securing the socket 2212 in a horizontal position. This position may be useful for storage or transport. In FIG. 25, the pin 2256 is inserted in the first additional aperture 2250, securing the socket 2212 in an angled position. Such a position may be useful for assembly of the crane.

Figure 27:
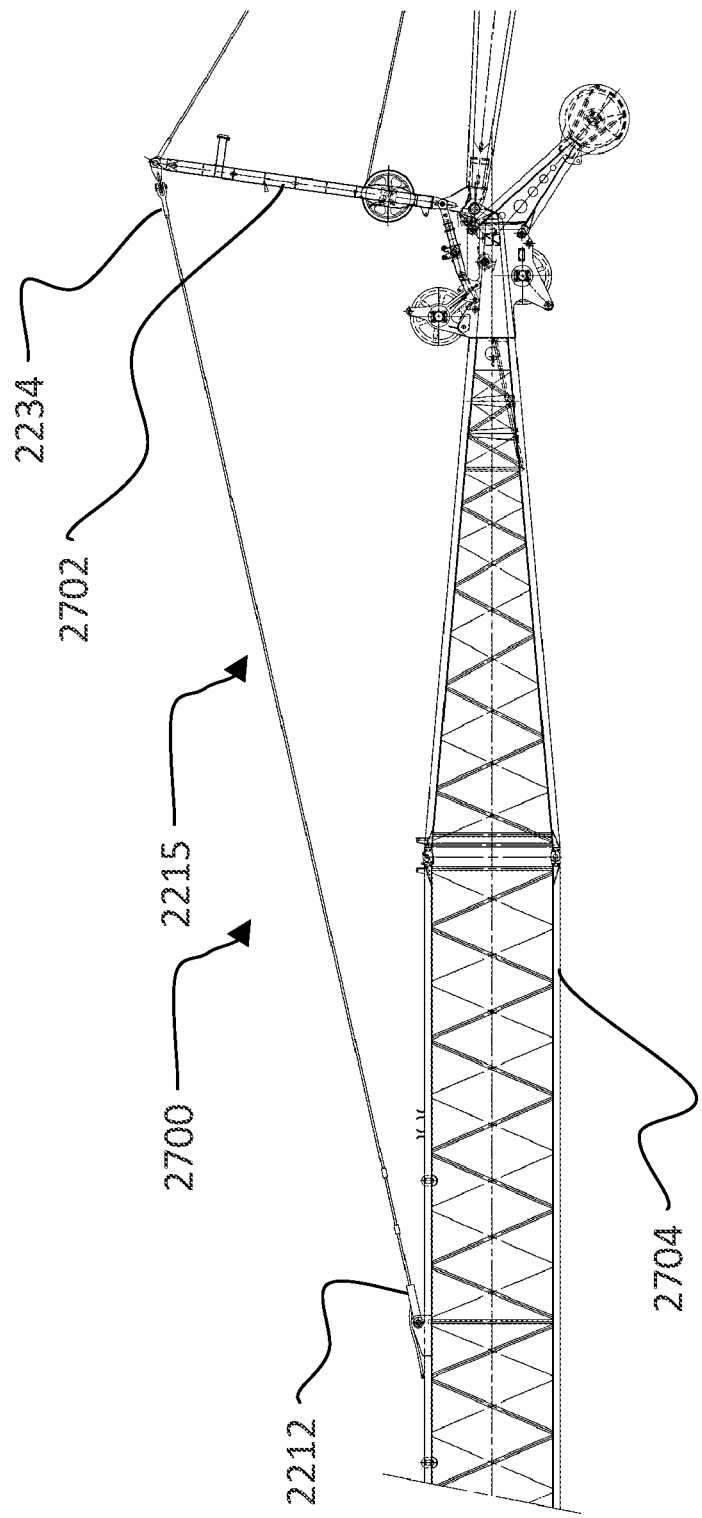
FIG. 27 illustrates an adjustable length tensioning assembly used as a jib backstay.

FIG. 27 illustrates another embodiment of an adjustable length tensioning assembly 2700. In this embodiment, the first crane member is a jib mast 2702 and the second crane member is a boom 2704. The adjustable length tensioning assembly 2700 is comprised of the components described previously, with the first connection point 2234 of the rope assembly 2215 coupled to the jib mast 2704 and the socket 2212 coupled to the boom 2704, which together form a jib backstay. In some embodiments the components are reversed, with the socket 2212 coupled to the jib mast 2704 and the socket 2212 coupled to the boom 2704. In other embodiments the first crane member is a jib mast 2702 and the second crane member is a jib and the rope assembly 2215 connects the two.

Embodiments of the disclosed subject matter are further directed to a method for erecting a crane using the described intermediate suspension connection column segment. In the method, at least three boom segments are assembled end to end with at least one of the boom segments having an intermediate suspension connection between the ends of the boom segment. The at least three boom segments are then coupled end to end to form a suspension column. A first end of the assembled suspension column is then coupled to a hinge pivot point, such as a pivot point on a rotating bed or a pivot point on an end of a boom. A plurality of straps are then coupled end to end to form a suspension to connection a second end of the assemble suspension column to a mast. A suspension element is then coupled between the intermediate suspension connection and the suspension. The suspension is then tensioned to lift the second end of the boom. The mast may be a live mast in which tensioning the straps is done by rotating the mast proximate the carbody, or it may be a fixed mast in which instance tensioning the suspension is done by shortening a distance between the mast and the suspension.

Embodiments of the disclosed subject matter are further directed to a method for connecting a tensioning assembly between two crane components, such as boom 2704 and jib mast backstay 2702 of FIG. 27. In the method, a first end of a rope connector 2215 is coupled to a first crane component, such as boom 2704. In the embodiment of FIG. 27, the rope connector 2215 is coupled to the boom 2704 by a pinned connection, but other connection types as known in the art such as bolted connection are possible. A socket 2212 is coupled to a second crane component, such as jib mast backstay 2702. The socket 2212 is coupled to the jib mast back stay 2702 through a pinned connection in the embodiment of FIG. 27, but other connection types as known in the art are possible.

A portion of the rope connector 2215 is passed through the slot 1625 into the recess 1623. The portion of the rope connector 2215 passed though the slot is dependent on the desired length of the tensioning assembly. An enlarged connection point on the rope connector 2215, such as a button, corresponds to the desired length, and the portion of rope 2232 adjacent the enlarged portion on the side of the first component is passed through the slot 1625. The rope connector 2215 is passed through the socket 2212 until the enlarged portion engages a seat in the socket. The enlarged portion is then secured within the recess. The first crane component is then moved relative to the second crane component, tensioning the rope assembly.

In some embodiments, the method further includes securing a free end of the rope connector to the second crane component. The connection at the second end of the rope is typically used to protect the rope connector and need not be designed to carry a load.

In some embodiments, the rope connector 2215 is passed through the socket with the socket at an angle relative to the horizontal. For example, in FIG. 25, the socket 2212 is positioned to receive the rope connector 2215.

It should be understood that various changes and modifications to the presently preferred embodiments described herein will be apparent to those skilled in the art. For example, instead of two separate post inserts being used a single post insert spanning the two posts may be used. Or the flexible pendant could be replaced with a single rigid pendant that did not expand. Additionally the suspension connection could be mounted on a location other than the lower cross member so long as it is disposed between the two ends of the boom insert. The pendant and socket can also be used in locations other than a boom intermediate suspension such as, but not limited to, boom suspension, jib suspension and jib backstay suspension.

The invention claimed is:

1. A method for connecting a tensioning assembly between first and second crane components, the tensioning assembly comprising a rope connector and a socket, the rope connector comprising a rope having a first end, a second end, and a first diameter; a first rope connector disposed at the first end of the rope; a second rope connector disposed at the second end of the rope; and a plurality of enlarged diameter connection points disposed between the first rope connector and the second rope connector, the plurality of enlarged diameter connection points having a second diameter greater than the first diameter, the method comprising:
   coupling the first rope connector of the rope connector with the first crane component;
   coupling the socket to the second crane component, the socket comprising:
      a recess with a first portion having a third diameter greater than the second diameter of the enlarged diameter connection points and a second portion having a fourth diameter greater than the first diameter of the rope and less than the second diameter of the enlarged diameter connection points;
      a transition from the first portion to the second portion forming a seat;
      an access slot extending laterally from a lateral side of the socket to the recess and axially a length of the recess, the access slot having a width greater than the first diameter and less than the second diameter; and,
      an aperture disposed traverse to the recess, the aperture sized and shaped to receive a retaining pin for retaining a connection point of the rope connector in the recess;
   passing a portion of the rope into the second portion until one of the plurality of enlarged diameter connection points is within the first portion;
   securing an enlarged diameter connection point within the first portion; and
   moving the first crane component relative to the second crane component to tension the tensioning assembly.

2. The method of claim 1, further comprising securing the second rope connector of the rope to the second crane component.

3. The method of claim 1, further wherein passing the portion of the rope connector is performed with the socket non perpendicular to a surface of the second crane component and wherein the method further includes, pivoting the socket perpendicular to the surface of the second crane component and securing the socket in place.

* * * * *